(12) United States Patent
Kitajima et al.

(10) Patent No.: US 12,194,397 B2
(45) Date of Patent: Jan. 14, 2025

(54) MEASUREMENT UNIT AND FILTER DEVICE

(71) Applicant: YAMASHIN-FILTER CORP., Kanagawa (JP)

(72) Inventors: Nobuyuki Kitajima, Kanagawa (JP); Nobuki Sasaki, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 327 days.

(21) Appl. No.: 17/722,434

(22) Filed: Apr. 18, 2022

(65) Prior Publication Data

US 2022/0233977 A1 Jul. 28, 2022

Related U.S. Application Data

(63) Continuation of application No. PCT/JP2020/041180, filed on Nov. 4, 2020.

(30) Foreign Application Priority Data

Nov. 6, 2019 (JP) ................................. 2019-201240

(51) Int. Cl.
*B01D 29/60* (2006.01)
*B01D 29/21* (2006.01)
*B01D 35/027* (2006.01)
*G01L 9/00* (2006.01)
(Continued)

(52) U.S. Cl.
CPC ........... *B01D 29/606* (2013.01); *B01D 29/21* (2013.01); *B01D 35/027* (2013.01); *G01L 9/0051* (2013.01); *G01L 19/086* (2013.01); *B01D 2201/0446* (2013.01);
(Continued)

(58) Field of Classification Search
CPC .... B01D 29/606; B01D 29/21; B01D 35/027; B01D 2201/0446; B01D 2201/301; B01D 2201/56; B01D 2201/30; B01D 2201/52; B01D 35/143; G01L 9/0051;
(Continued)

(56) References Cited

U.S. PATENT DOCUMENTS

2010/0131213 A1\* 5/2010 Bleys .................... G01L 19/086
702/50
2015/0310724 A1\* 10/2015 Roberge ................. G01L 9/008
340/626
2020/0298148 A1 9/2020 Kitajima

FOREIGN PATENT DOCUMENTS

JP 2002-329177 A 11/2002
JP 2014067177 A \* 4/2014
JP 2018-147212 A 9/2018
(Continued)

OTHER PUBLICATIONS

Extended European Search Report issued in European Patent Application No. 20885529.6, mailed on Nov. 23, 2022 (7 pages).
(Continued)

*Primary Examiner* — Waqaas Ali
(74) *Attorney, Agent, or Firm* — Nakanishi IP Associates, LLC

(57) ABSTRACT

A measurement portion and an antenna are allowed to be provided in a filter device by simply mounting one member. An antenna unit that includes an antenna configured to communicate with an IC tag is provided in a vicinity of a first end face as one end of a case. A sensor is provided inside the case and a back side of the case with respect to the antenna unit.

10 Claims, 11 Drawing Sheets

(51) Int. Cl.
*G01L 19/08* (2006.01)
*G08C 17/02* (2006.01)

(52) U.S. Cl.
CPC .... *B01D 2201/301* (2013.01); *B01D 2201/56* (2013.01); *G08C 17/02* (2013.01)

(58) Field of Classification Search
CPC ... G01L 19/086; G01L 19/0092; G08C 17/02; G01D 11/24; G01D 11/30; G01K 1/14
See application file for complete search history.

(56) References Cited

FOREIGN PATENT DOCUMENTS

| JP | 2019-115879 A | 7/2019 |
| WO | 2005/113112 A1 | 12/2005 |
| WO | 2014/077053 A1 | 5/2014 |
| WO | 2015/002307 A1 | 1/2015 |

OTHER PUBLICATIONS

Office Action issued in Japanese Patent Application No. 2019-201240 dated Aug. 22, 2023, with English Translation (6 pages).
International Search Report issued in PCT/JP2020/041180 mailed on Dec. 28, 2020 with English Translation (5 pages).

* cited by examiner

MEASUREMENT UNIT AND FILTER DEVICE

CROSS-REFERENCE TO RELATED APPLICATIONS

This application is a continuation application of International Patent Application No. PCT/JP2020/041180 filed on Nov. 4, 2020, which claims priority to Japanese Patent Application No. 2019-201240 filed on Nov. 6, 2019, the entire contents of which are incorporated by reference.

TECHNICAL FIELD

The present invention relates to a measurement unit and a filter device.

BACKGROUND ART

Patent Document 1 discloses a filter device in which an IC tag is provided to inside an upper plate provided so as to cover an upper end face of a filtration member in a filter element. An antenna is provided on a lid body that covers a case into which the filter element is inserted.

CITATION LIST

Patent Literature

Patent Document 1: JP 2019-115879 A

In recent years, to reduce mounting of an imitation and management of an operating time and the like, attaching an IC tag to a filter element has been demanded. However, in the invention described in Patent Document 1, an antenna assembly needs to be mounted on the lid body alone. Therefore, to provide a measurement portion, such as a differential pressure sensor, to the filter device, the two members, the measurement portion and the antenna assembly, need to be mounted on the lid body, and this caused an issue of a mistake in mounting and an increase in cost.

SUMMARY OF INVENTION

One or more embodiments of the present invention provide a measurement unit and a filter device with which a measurement portion and an antenna can be provided in the filter device by simply mounting one member.

A measurement unit according to one or more embodiments of the present invention includes, for example, a case, an antenna unit, and a sensor. The case has a pillar shape. The antenna unit includes an antenna. The antenna is provided on the case and is configured to communicate with an IC tag. The sensor is provided in the case. The antenna unit is provided in a vicinity of a first end face as one end of the case. The sensor is provided inside the case and a back side of the case with respect to the antenna unit.

According to the measurement unit according to one or more embodiments of the present invention, the antenna unit that includes the antenna configured to communicate with the IC tag is provided in the vicinity of the first end face as one end of the case. The sensor is provided inside the case and a back side of the case with respect to the antenna unit. As a result, a measurement portion and the antenna can be provided in a filter device by simply mounting one member.

Here, when viewed along a center axis of the case, the antenna unit may overlap with the sensor. Accordingly, the measurement unit can be downsized.

Here, the case may have a first hole, a second hole, a third hole, and a fourth hole. The first hole may open at the first end face. The second hole may open at a second end face as an end face on a side opposite to the first end face. The third hole is a through-hole having an end opening to the first hole and another end opening to the second hole. The fourth hole may open to the second hole. When viewed along a center axis of the case, the third hole may be non-overlapping with the fourth hole. The antenna unit may have a plate shape. A wiring pattern as the antenna may be formed on one surface of the antenna unit. The antenna unit may be provided in the first hole such that the antenna is exposed from an opening of the first hole. An antenna wire having one end connected to the antenna unit may be provided in the third hole. At least the sensor or a first substrate to which the sensor is connected may be disposed in the fourth hole. As a result, the antenna unit, the antenna wire, and the measurement portion (the sensor or the first substrate) can be provided at different positions, and both functions of the antenna and the measurement portion can be achieved.

Here, a cover covering an opening of the second hole may be provided. A second substrate may be provided in the second hole. The antenna wire may have another end provided on the second substrate. The first substrate may be provided in the fourth hole. A power cable that penetrates the cover and supplies the first substrate and the second substrate with power may be provided. This allows supplying the power to the two substrates with one set of the power cables and saving a space.

Here, the case may have a fifth hole and a sixth hole. The fifth hole may open to the first hole. The sixth hole is a through-hole having an end opening to a side surface of the case and another end opening to a vicinity of a bottom surface of the fifth hole. The antenna unit may have a diameter a same as an inner diameter of the first hole. The antenna unit may have a seventh hole that is a through-hole, which penetrates in a direction crossing an axial direction of the antenna. A spool and an elastic member may be provided in the fifth hole. The spool may be slidable inside the fifth hole and divide the fifth hole into a first space and a second space and divide the fifth hole into a first space and a second space. The elastic member may urge a force in a direction heading from the first space to the second space on the spool. A magnet may be provided on a surface facing the bottom surface of the fifth hole of the spool. The first substrate may be provided in the fourth hole. A magnetic field detection element as the sensor may be provided on the first substrate. The magnetic field detection element may be provided at a position overlapping with the magnet when viewed along a center axis of the case. This allows providing the differential pressure detection unit and the antenna unit inside one measurement unit.

Here, the case may have a fifth hole, a sixth hole, a seventh hole, and an eighth hole that is a through-hole. The fifth hole may open to the first hole. The sixth hole may open to the fifth hole. The seventh hole may communicate between a side surface of the case and the sixth hole. The eighth hole may have an end opening to the fourth hole and another end opening to the fifth hole. The antenna unit may have a diameter a same as an inner diameter of the first hole. The antenna unit may have a seventh hole, which penetrates in a direction crossing an axial direction of the antenna. A strain gauge as the sensor may be provided on a bottom surface of the fifth hole. In the eighth hole, a cable having one end connected to the strain gauge may be provided. This allows providing a pressure detection unit and the antenna unit inside one measurement unit.

Here, the fourth hole may have a bottom surface adjacent to a bottom surface of the first hole or the first end face. A temperature detection element as the sensor may be provided in a vicinity of the bottom surface of the fourth hole. This allows providing a temperature detection unit and the antenna unit inside one measurement unit.

Here, the antenna may have a circular ring shape in a plan view. The case may have a first hole and a second hole. The first hole may open at a second end face as an end face on a side opposite to the first end face. The second hole may be a through-hole having an end opening to the first hole and another end opening at the first end face. The antenna unit may include a cover. The cover may be made of an elastically deformable material and internally includes the antenna unit. The cover may have a protrusion portion inserted into a hollow portion of the antenna. The protrusion portion may be provided in the first hole to provide the cover on the first end face. The antenna unit may be provided adjacent to the first end face. The protrusion portion may have a third hole. The third hole may penetrate penetrates in a direction crossing an axial direction of the protrusion and communicate between outside of the case and the tenth hole. At least the sensor or a first substrate to which the sensor is connected may be provided inside the first hole. As a result, the antenna unit, the antenna wire, and the sensor can be provided at different positions, and both functions of the antenna and the measurement portion can be achieved. In addition, the antenna is covered with the cover and the antenna does not contact liquid, and thus the IC tag is easily read.

A filter device according to the present invention includes, for example, the measurement unit, a filter case, a head, and a filter element. The filter case has a bottomed tubular shape with an open upper end. The head is provided on the case so as to cover the upper end of the filter case. The filter element is provided in an internal space formed by the filter case and the head. The filter element includes a filtration member and an upper plate. The filtration member has a tubular shape. The upper plate is provided so as to cover an upper end face of the filtration member. The IC tag is provided on the upper plate. The measurement unit is provided on the head such that the antenna unit is exposed to a space formed by the filter case, the filter element, and the head.

According to the filter device according to the present invention, the head is provided on the case so as to cover the opening of the upper end of the filter case having the bottomed tubular shape. The filter element is provided in the internal space formed by the filter case and the head. The IC tag is provided on the upper plate of the filter element. The measurement unit is provided on the head such that the antenna unit is exposed to the space formed by the filter case, the filter element, and the head. This allows measurement (such as a pressure and a temperature) of the filter device and reading of the IC tag simultaneously by simply mounting the measurement unit. Additionally, since the antenna is exposed to the space formed by the filter case, the filter element, and the head, recording information of the IC tag can be accurately read even with the metallic head.

Here, the upper plate may include a plate-shaped portion and a protruding portion. The filtration member may abut on a lower side of the plate-shaped portion. The protruding portion may be provided on the plate-shaped portion. The IC tag may be provided inside the protruding portion. The protruding portion may project upward from the plate-shaped portion. The protruding portion may project outside the plate-shaped portion when viewed along a center axis of the filter element. The head may have a projection to position the protruding portion in a circumferential direction. The measurement unit may be provided in a vicinity of the projection. With the filter element inserted into an inside of the case, the IC tag may be adjacent to the antenna unit. In this way, the IC tag and the antenna can be disposed as close as possible, and the recording information of the IC tag can be accurately read even with the use of an IC tag (for example, an HF band) having a short transmission distance (a detection distance).

Here, the IC tag may have a hollow circular plate shape. The IC tag may have an inner diameter greater than an inner diameter of the filtration member. The IC tag may be provided on the upper plate with an adhesive that bonds the filtration member and the upper plate together. This eliminates a need for positioning the IC tag and the antenna and facilitates assembly of the return filter. In the present embodiment, since positioning of the IC tag and the antenna is unnecessary, the measurement unit can be provided at various positions.

According to one or more embodiments of the present invention, the measurement portion and an antenna assembly are allowed to be provided in the filter device by simply mounting one member.

DESCRIPTION OF EMBODIMENTS

Hereinafter, embodiments of the present invention will be described in detail with reference to the drawings. While the following embodiments are described with an example of a return filter provided in a tank that stores hydraulic oil, a filter device of the present invention is not limited to the return filter, and, for example, can be used for a fuel filter. In the present embodiment, while hydraulic oil is described as an example of liquid to be filtered, the liquid to be filtered is not limited to the hydraulic oil.

First Embodiment

Figure 1:
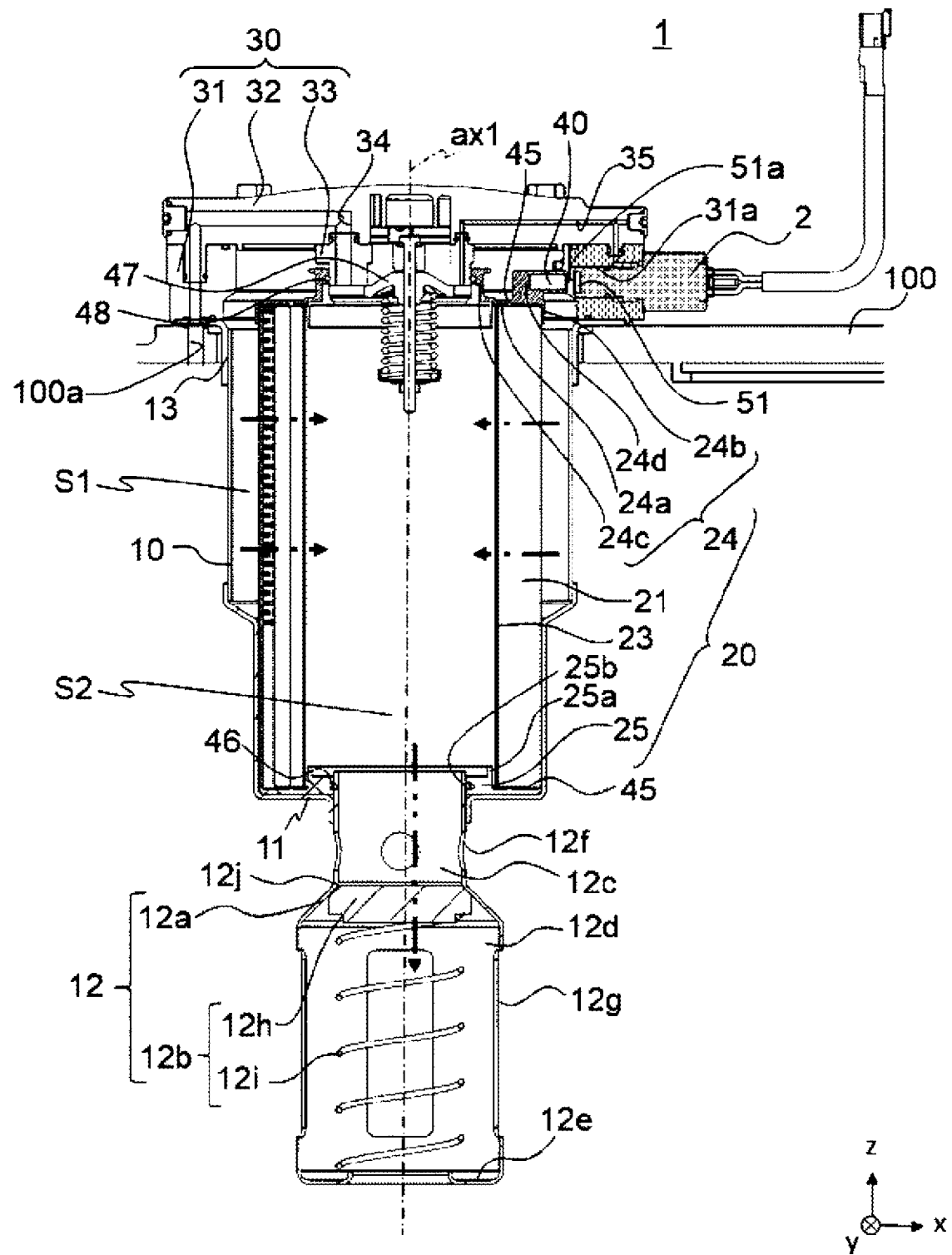
FIG. 1 is a cross-sectional view illustrating an outline of a return filter 1 as an embodiment of the present invention.

FIG. 1 is a cross-sectional view illustrating an outline of a return filter 1. FIG. 1 partially omits hatching indicating a cross section.

The return filter 1 mainly includes a measurement unit 2, a filter case 10, a filter element 20, a head 30, and an IC tag 40. The IC tag 40 is a small electronic component that can communicate with an antenna 51a (described in detail later) and contactlessly reads and writes data in a built-in memory using radio waves received from the antenna 51a.

The filter case 10 is made of a metal having high corrosion resistance (for example, stainless steel). The filter case 10 is provided inside the tank so as to protrude from a top surface of the tank to a lower side (−z side).

The filter case 10 has a bottomed substantially tubular shape and has an open upper end face. The filter case 10 is hollow inside and internally includes the filter element 20, and the like.

The filter case 10 has a bottom surface 11. An outflow portion 12 is provided so as to penetrate the bottom surface 11. The outflow portion 12 causes a space (a space S2) inside the filter element 20 to communicate with a space outside the filter case 10.

The outflow portion 12 mainly includes a cylindrical portion 12a having a substantially bottomed cylindrical shape and a back pressure valve 12b.

The cylindrical portion 12a has a substantially bottomed cylindrical shape as a whole, and includes a first cylindrical portion 12c, a second cylindrical portion 12d, and a bottom surface 12e. The second cylindrical portion 12d is provided on a lower side of the first cylindrical portion 12c. An outflow hole 12f is formed in the first cylindrical portion 12c, and an outflow hole 12g is formed in the second cylindrical portion 12d. The outflow holes 12f and 12g are formed on side surfaces of the first cylindrical portion 12c and the second cylindrical portion 12d so as to penetrate the first cylindrical portion 12c and the second cylindrical portion 12d, respectively.

The back pressure valve 12b is provided inside the cylindrical portion 12a. The back pressure valve 12b mainly includes a valve body 12h having a substantially plate shape and an elastic member 12i provided between the bottom surface 12e and the valve body 12h. The elastic member 12i pushes the valve body 12h to a valve seat 12j provided between the first cylindrical portion 12c and the second cylindrical portion 12d.

The filter case 10 includes a mounting member 13 provided in the vicinity of an upper end thereof. The filter case 10 is provided in a tank 100 via the mounting member 13. Furthermore, the mounting member 13 integrates the filter case 10 and a tubular portion 31 (described in detail later).

An inflow portion (not illustrated) is provided on a side surface of the filter case 10. The inflow portion causes hydraulic oil to flow into a space (a space SD inside the filter case 10 and outside the filter element 20.

The filter element 20 is a member having a bottomed substantially tubular shape and provided in an internal space formed by the filter case 10 and the head 30. The filter element 20 mainly includes a filtration member 21, an inner tube 23, a plate 24, a plate 25, and the IC tag 40.

The filtration member 21 is a member having a substantially cylindrical shape and having openings at both ends. The filtration member 21 is formed by pleating a filter paper using, for example, synthetic resin or a paper, and connecting both ends of the pleated filter paper to form a cylindrical shape. The inner tube 23 where holes through which the hydraulic oil passes are formed in a substantially entire area is provided inside the filtration member 21. An outer tube having holes through which the hydraulic oil passes may be formed in a substantially entire area outside the filtration member 21.

The plate 24 made of resin is provided on an end on the upper side of the filtration member 21. The plate 24 covers upper end faces of the filtration member 21 and the inner tube 23. An adhesive 45 is applied between the plate 24 and the filtration member 21, and the plate 24 and the filtration member 21 are bonded with the adhesive 45. Although the adhesive 45 is liquid when applied, the adhesive 45 hardens over time to bond the plate 24 and the filtration member 21 together. Here, various types of organic adhesives using resin, rubber, and elastomer as the main material can be used as the adhesive 45.

The plate 24 mainly includes a plate-shaped portion 24a having a substantially circular plate shape provided along an upper end face of the filtration member 21 such that the filtration member 21 abuts on a lower side of the plate-shaped portion 24a, a tubular portion 24b provided on outer peripheral edge of the plate-shaped portion 24a, a tubular portion 24c provided on an inner peripheral edge of the plate-shaped portion 24a, and a protruding portion 24d provided in the plate-shaped portion 24a. The tubular portion 24b protrudes downward (in the −z direction) from the plate-shaped portion 24a. The tubular portion 24c protrudes upward (in the +z direction) from the plate-shaped portion 24a.

The protruding portion 24d protrudes upward from the plate-shaped portion 24a. Also, the protruding portion 24d protrudes outside the plate-shaped portion 24a when viewed along a center axis ax1 of the filter element 20 (when viewed along the z-direction).

The IC tag 40 is coated with resin. The IC tag 40 is provided on the plate 24 so as to not contact the hydraulic oil. In the present embodiment, the IC tag 40 is provided inside the protruding portion 24d.

The plate 25 is provided on an end on the lower side of the filtration member 21. The plate 25 is a member having a substantially hollow circular plate shape that covers lower end faces of the filtration member 21 and the inner tube 23. A recessed portion 25a into which the filtration member 21 is inserted is formed in a surface of the upper side of the plate 25. The adhesive 45 is applied between the recessed portion 25a and the filtration member 21, and the recessed portion 25a and the filtration member 21 are bonded with the adhesive 45.

The outflow portion 12 is inserted into a hole 25b formed in the substantially center of the plate 25. The hole 25b and the outflow portion 12 are sealed by a sealing member (for example, an O-ring) 46.

The head 30 is provided on the outside of the tank. The head 30 is provided on the filter case 10 (here, the mounting member 13) and the plate 24 (here, the tubular portion 24c) so as to cover the opening of the upper end face of the filter case 10.

The head 30 is made of a metal having high corrosion resistance (for example, stainless steel). The head 30 mainly includes the tubular portion 31, a cover 32, and a mounting portion 33. The tubular portion 31 has a substantially cylindrical shape and is fixed to the filter case 10 (here, the mounting member 13). The cover 32 is a substantially plate-shaped member and provided on the upper side (+z-side) of the tubular portion 31 so as to cover a hollow portion of the tubular portion 31. The cover 32 is detachably provided to the tubular portion 31.

The tubular portion 31 has an inner diameter greater than an outer diameter of the plate 24 (the plate-shaped portion 24a and the tubular portion 24b). The tubular portion 31 has a side surface on which a hole 31a penetrating the side surface is provided. By inserting and fixing the measurement unit 2 to the hole 31a, the measurement unit 2 is provided on the tubular portion 31. In the present embodiment, the measurement unit 2 is provided in the hole 31a by screwing an external thread portion 50q (see FIG. 3) provided on the outer peripheral surface of the measurement unit 2 and an internal thread portion (not illustrated) formed in the hole 31a. The measurement unit 2 includes an antenna 51a. Accordingly, the antenna 51a can be easily mounted to the head 30. Note that FIG. 1 omits detailed illustration of the internal structure of the measurement unit 2.

The mounting portion 33 is provided on the cover 32. The mounting portion 33 is a substantially tubular member, and protrudes to the lower side (−z-side) of the cover 32. A valve 47 is provided on a lower side of the mounting portion 33. The valve 47 is usually closed. When the filtration member 21 becomes clogged and a pressure inside the filter case 10 increases, the valve 47 opens to flow the hydraulic oil from the space S1 to the space S2 to reduce damage of the return filter 1. Since the valve 47 is already known, a description thereof is omitted.

The mounting portion 33 is inserted into the tubular portion 24c, and the valve 47 is inserted into the space S2. The mounting portion 33 and the tubular portion 24c are sealed by a sealing member (for example, an O-ring) 48.

A flow path 34 for air and hydraulic oil is provided in the head 30. The flow path 34 is constituted by a hole formed in the mounting portion 33, a hole formed in the cover 32, and a hole formed in the tubular portion 31, and communicates between the internal space of the tank 100 and the space S2 via a hole 100a formed in the tank 100.

Further, the head 30 has a hole 35 that communicates between the space S2 and the hole 31a. The hole 35 is constituted by a hole formed in the mounting portion 33, a hole formed in the cover 32, and a hole formed in the tubular portion 31, and has one end opening to the side surface of the hole 31a. The hole 35 communicates with a hole 50f (see FIG. 3, described in detail later) provided in the measurement unit 2, and communicates between a space S4 (see FIG. 3, described in detail later) inside the measurement unit 2 and the space S2.

Figure 2:
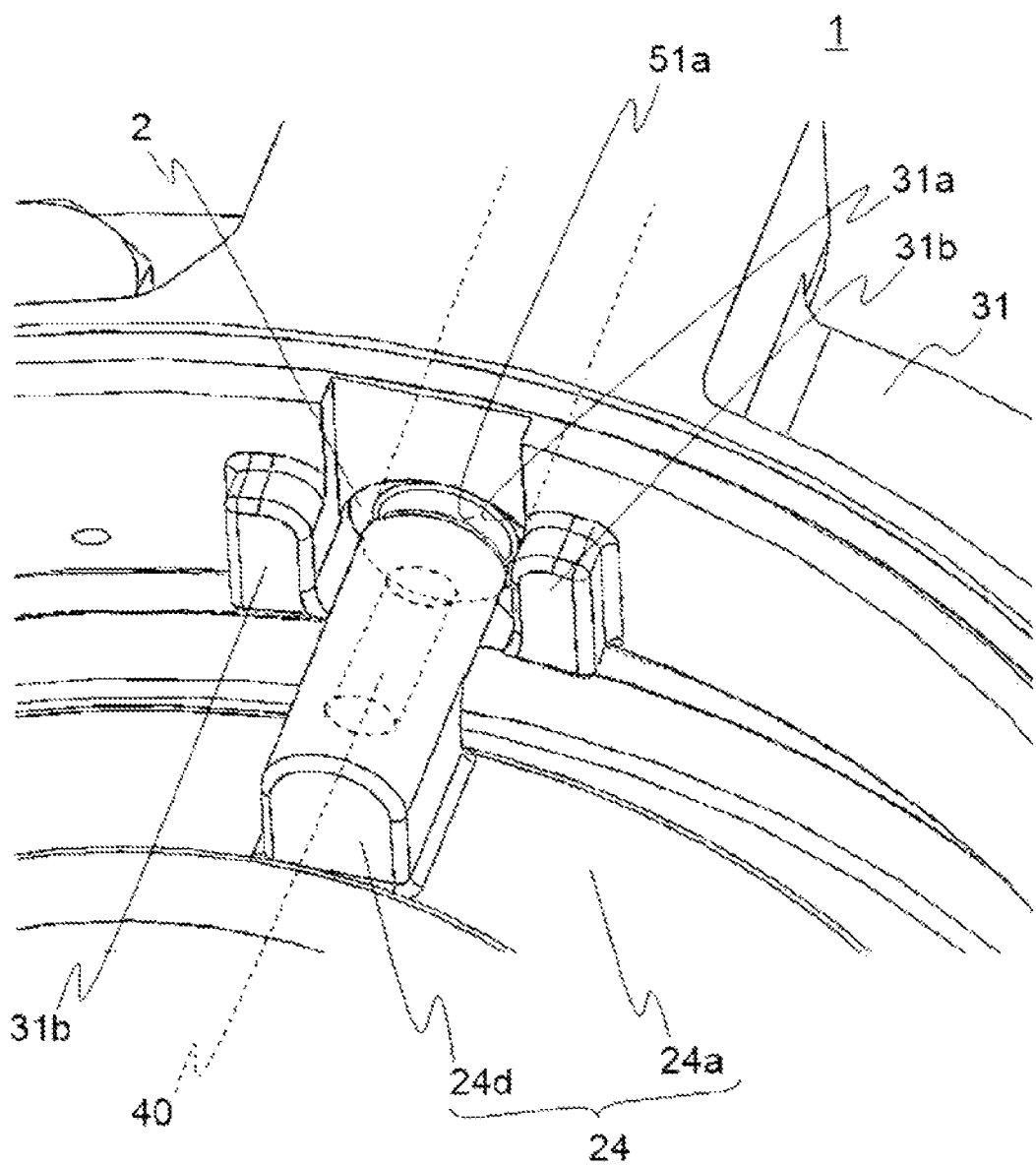
FIG. 2 is a perspective view when a plate 24 and a tubular portion 31 of the return filter 1 are viewed obliquely from above and is a partially enlarged view.

FIG. 2 is a perspective view when the plate 24 and the tubular portion 31 are viewed obliquely from above and is a partially enlarged view.

The substantially cylindrical IC tag 40 is provided inside the protruding portion 24d. Avoiding a contact of the IC tag 40 with liquid allows reducing a failure of the IC tag 40.

Into the hole 31a, which penetrates the side surface of the tubular portion 31, the measurement unit 2 is inserted. The antenna 51a (described in detail later) is exposed from an opening on the inner peripheral surface side of the hole 31a.

Two projections 31b are formed on the side surface of the tubular portion 31. The projections 31b are formed on an inner peripheral surface of the tubular portion 31 so as to protrude inward in a radial direction. The projections 31b are formed in the vicinity of the hole 31a, here, on both sides of the hole 31a. That is, the measurement unit 2 is provided in the vicinity of the projections 31b.

The projections 31b position the protruding portion 24d in the circumferential direction. The protruding portion 24d is disposed between the two projections 31b. Therefore, the IC tag 40 and the antenna 51a are provided adjacent to one another and disposed as close as possible, and thus sensing can be reliably performed.

Especially, since the protruding portion 24d protrudes upward from the plate-shaped portion 24a in side view and protrudes outward of the plate-shaped portion 24a in plan view, in the state where the filter element 20 is inserted into the inside of the filter case 10, the distance between the IC tag 40 and the antenna 51a is close, and the end face of the IC tag 40 faces the antenna 51a. Therefore, the IC tag 40 and the antenna 51a are disposed as close as possible, and thus sensing can be more reliably performed even the use of the inexpensive IC tag 40.

Figure 3:
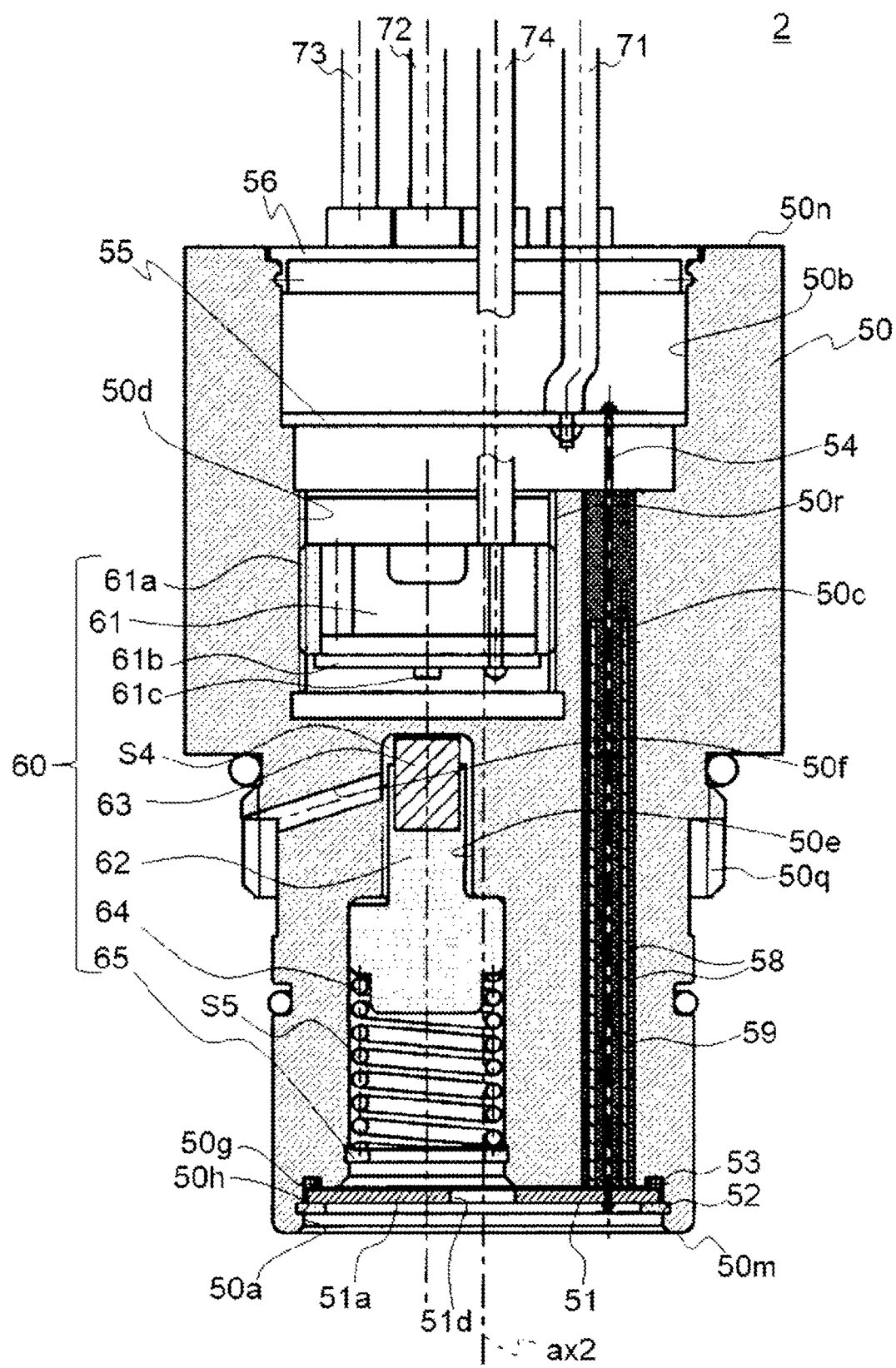
FIG. 3 is a cross-sectional view illustrating an outline of a measurement unit 2 as an embodiment of the present invention.

Next, the measurement unit 2 is described. FIG. 3 is a cross-sectional view illustrating an outline of the measurement unit 2. FIG. 3 partially omits hatching indicating a cross section.

The measurement unit 2 mainly includes a case 50, an antenna unit 51, and a differential pressure detection unit 60. The differential pressure detection unit 60 mainly includes a detection unit 61, a spool 62, a magnet 63, and an elastic member 64.

The case 50 has a substantially columnar shape, and is provided with the antenna 51a (described in detail later) and a magnetic field detection element 61c (equivalent to a sensor of the present invention).

Additionally, the case 50 has a hole 50a (equivalent to a first hole of the present invention), a hole 50b (equivalent to a second hole of the present invention), holes 50c (equivalent to a third hole of the present invention), a hole 50d (equivalent to a fourth hole of the present invention), a hole 50e (equivalent to a fifth hole of the present invention), and the hole 50f (equivalent to a sixth hole of the present invention). The case 50 has respective end faces 50m and 50n at both ends. The hole 50a opens to the end face 50m, and the hole 50b opens to the end face 50n. The holes 50c have both ends opening to the hole 50a and the hole 50b. The hole 50d opens to the hole 50b, and the hole 50e opens to the hole 50a. The hole 50f penetrates the case 50 in the radial direction, and has both ends opening to the vicinity of the bottom surface of the hole 50e and an outer peripheral surface of the case 50. The hole 50a, the hole 50b, the hole 50c, the hole 50d, the hole 50e, and the hole 50f each have a substantially cylindrical shape.

The antenna unit 51 is provided in the hole 50a. The antenna unit 51 has a substantially plate shape and a diameter substantially the same as an inner diameter of the hole 50a. The antenna unit 51 has a hole 51d that penetrates in the thickness direction, and the hole 50e communicates with the hole 50a via the hole 51d.

A recessed portion 50g is provided on a bottom surface of the hole 50a, and a sealing member (here, an O-ring) 53 is provided on the recessed portion 50g. Additionally, a recessed portion 50h is provided on the side surface of the hole 50a, and a retainer ring 52 is provided on the recessed portion 50h. The sealing member 53 has elasticity and pushes the antenna unit 51 toward the retainer ring 52 side, and thus the antenna unit 51 is provided inside the hole 50a.

Figure 4:
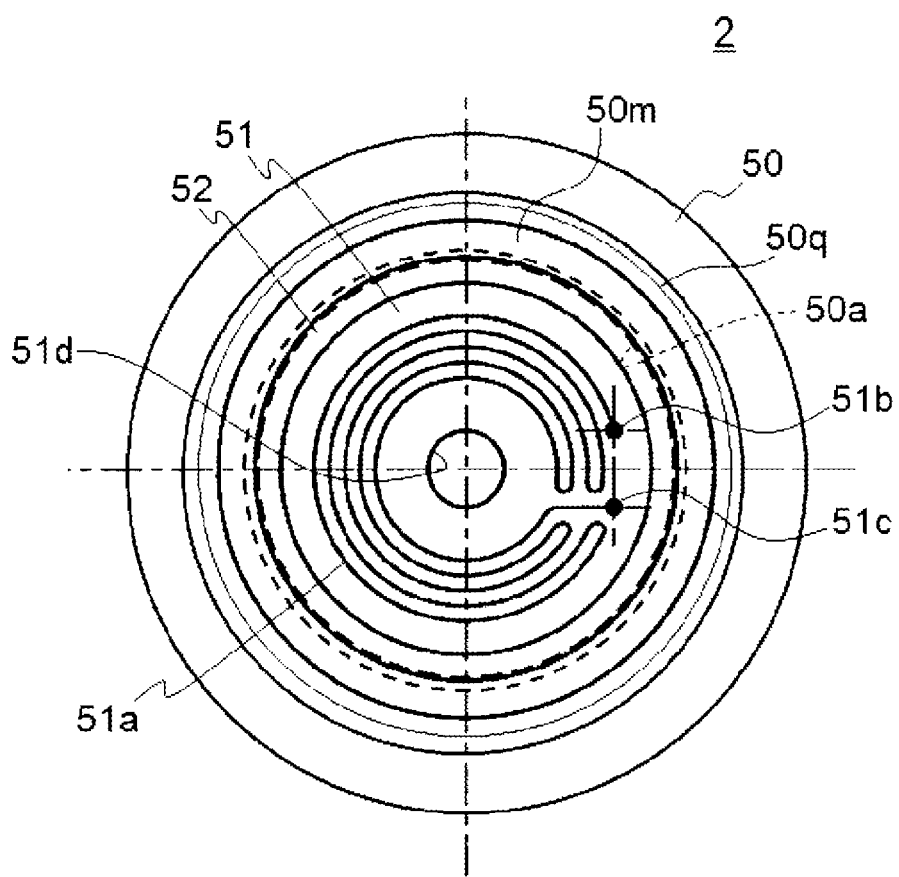
FIG. 4 is a diagram illustrating an outline of the measurement unit 2 when viewed from a distal end side.

FIG. 4 is a diagram illustrating an outline of the measurement unit 2 when viewed from a distal end side (the end face 50m side). The antenna 51a is provided on the surface on the end face 50m side of the antenna unit 51. The antenna 51a is a wiring pattern (an antenna coil pattern) formed on one surface of the antenna unit 51, and antenna terminals 51b and 51c are provided on both ends. An antenna wire 54 (see FIG. 3) is connected to the respective antenna terminals 51b and 51c.

The antenna unit 51 is provided inside the hole 50a such that the antenna 51a is exposed from the opening of the hole 50a. As a result, when the measurement unit 2 is provided on the head 30, the antenna 51a is exposed to a space formed by the filter case 10, the filter element 20, and the head 30.

The description will now return to FIG. 3. The two holes 50c are provided adjacent to one another in the case 50, and the antenna wire 54 is provided to the respective holes 50c. A substrate 55, which is an IC tag reader substrate (equivalent to a second substrate of the present invention), is provided in the hole 50b. The antenna wire 54 has one end provided on the antenna unit 51 and the other end provided on the substrate 55.

A filler 58 is provided inside the holes 50c so as to cover the antenna wire 54, and an insulating pipe 59 is provided outside the filler 58. The filler 58 is provided so as to cover the insulating pipe 59. The filler 58 is, for example, an adhesive having a high polymer compound as a main component. Filling the inside of the holes 50c with the filler 58 in this manner avoids the liquid to leak from the holes 50c to the hole 50d.

Note that in the present embodiment, the insulating pipe 59 is provided separately from the antenna wire 54, but the insulating pipe 59 is unnecessary as long as the antenna wire 54 has an insulating function. In this case, the holes 50c may be filled with the filler 58 so as to cover the antenna wire 54.

For example, an IC chip (not illustrated) is mounted on the substrate 55. When the substrate 55 receives a radio wave from the IC tag 40, the substrate 55 generates a reception signal via the antenna wire 54, and outputs a signal to the outside of the measurement unit 2 via a signal line 71.

The detection unit 61 is provided in the hole 50d. When viewed along a center axis ax2 of the case, the holes 50c and the hole 50d are disposed so as not to overlap.

The detection unit 61 has a substantially cylindrical shape, and an external thread portion 61a is formed around the detection unit 61. By screwing the external thread portion 61a into an internal thread portion 50r formed in the hole 50d, the detection unit 61 is provided inside the hole 50d, and a height of the detection unit 61 (a position in the direction along the center axis ax2) can be adjusted.

A substrate 61b (equivalent to a first substrate of the present invention) is provided on a distal end side (the end face 50m side) of the detection unit 61. A magnetic field detection element 61c is provided on the substrate 61b. In other words, the substrate 61b and the magnetic field detection element 61c are provided in the hole 50d. The magnetic field detection element 61c detects a change in magnetic field formed by the magnet 63. As the magnetic field detection element 61c, for example, a reed switch and a Hall element can be used. Since the reed switch and the Hall element has been already known, description of the reed switch and the Hall element will be omitted.

The spool 62, the magnet 63, and the elastic member 64 are provided inside the hole 50e. When viewed along the center axis ax2 of the case, the holes 50c and the hole 50e are disposed so as not to overlap.

The spool 62 is slidably provided inside the hole 50e. The spool 62 divides the hole 50e into the space S4 and a space S5. The space S4 communicates with the space S1 via the hole 50f. The space S5 communicates with the space S2 via the hole 50a.

The elastic member 64 is, for example, a coil spring, and has one end provided on the spool 62 and the other end provided on an E-ring 65 provided on the end face 50m side of the hole 50e. The elastic member 64 urges a force in a direction heading from the space S5 toward the space S4 on the spool 62.

Note that in the present embodiment, the elastic member 64 is provided on the end face 50m side with respect to the spool 62, but the elastic member 64 may be provided on the end face 50n side with respect to the spool 62. In this case, the elastic member 64 urges a force in a direction heading from the space S4 toward the space S5 on the spool 62.

The magnet 63 is provided on a surface facing the bottom surface of the hole 50e of the spool 62, that is, on the surface on the end face 50n side of the spool 62. The magnetic field detection element 61c is provided at a position overlapping with the magnet 63 when viewed along the center axis ax2 of the case 50.

When, for example, clogging of the filtration member 21 does not occur, and a pressure difference between the space S1 (the space S4) and the space S2 (the space S5) is less than or equal to a threshold value, the spool 62 is at a position close to the magnetic field detection element 61c by the urging force of the elastic member 64.

When pressure in the space S1 (the space S4) increases due to, for example, clogging of the filtration member 21, the spool 62 moves to the end face 50m side against the urging force of the elastic member 64. In accordance with this, the magnet 63 also moves toward the end face 50m side, and the magnet 63 moves away from the magnetic field detection element 61c. The magnetic field detection element 61c detects a change in magnetic flux density due to the movement of the magnet 63.

The detection result of the magnetic field detection element 61c is output to outside the measurement unit 2 via a signal line 74 having one end provided on the substrate 61b. The signal line 71 and power cables 72 and 73 are provided adjacent to the signal line 74.

The signal lines 71 and 74 and the power cables 72 and 73 penetrate a cover 56 covering the hole 50b. The power cables 72 and 73 supply power to the substrate 61b and the substrate 55, and are connected to the substrate 61b and the substrate 55 (not illustrated). This allows supplying the power to the two substrates (the substrate 61b and the substrate 55) with one set of the power cables 72 and 73 and saving a space.

Next, the functionality of the return filter 1 thus configured will be described. The dashed-two dotted line arrows in FIG. 1 indicate a flow of the hydraulic oil.

When an operation of an internal combustion engine (an engine) of a work machine stops, the hydraulic oil is not contained in the filter case 10. Thus, as illustrated in FIG. 1, the back pressure valve 12b is in the closed state.

While the engine is idling, a flow rate of the hydraulic oil is low, and therefore the back pressure valve 12b is in the closed state. Thus, the hydraulic oil flows into the filter case 10 from the inflow portion to rise the oil surface.

When the engine of the work machine operates, the flow rate of the hydraulic oil increases, the inside of the filter case 10 is filled with the hydraulic oil, and the pressure inside the filter case 10 becomes sufficiently high. As a result, the hydraulic oil pushes down the valve body 12h against the urging force of the elastic member 12i.

The hydraulic oil flowing into the space S1 flows from the outside to the inside of the filtration member 21, and the filtration member 21 removes, for example, dust in the hydraulic oil. The hydraulic oil after filtration flows out to the space S2. After that, the hydraulic oil after filtration flows out from the outflow portion 12 to the inside of the tank. During idling, the hydraulic oil after filtration flows out from the outflow hole 12f, and during engine operation, the hydraulic oil after filtration flows out from the outflow hole 12f and the outflow hole 12g.

Note that when the engine of the work machine stops, the flow rate of the hydraulic oil decreases and the back pressure valve 12b is closed. When a certain amount of period has passed after the work machine stops, the air flows into the inside of the filter case 10 through the flow path 34, thereby lowering the oil surface with respect to the bottom surface 11 without removing the cover 32 from the tubular portion 31.

As illustrated in FIG. 3, in a state where the pressure of the high-pressure side (the space S1) is low, the spool 62 is pushed to the back side (the high-pressure side, the end face 50n side) of the hole 50e due to the urging force of the elastic member 64, and the magnet 63 is at a position closest to the bottom surface of the hole 50e.

When pressure in the space S1 increases due to, for example, clogging of the filtration member 21, the spool 62 moves to the distal end side (the low pressure side, the end face 50m side) against the urging force of the elastic member 64. The detection unit 61 detects a change in the magnetic field due to the movement of the magnet 63, and transmits the detection result to an external device. In a case where the detection result of the differential pressure between the space S1 and the space S2 is a certain amount or more, that is, the clogging of the filtration member 21 exceeds a predetermined amount, the external device performs display prompting replacement of the filter element 20.

Since the clogging of the filtration member 21 is substantially proportional to the operating time of the filter element 20, the operating time of the filter element 20 is measured by the IC tag 40, the antenna 51a reads the IC tag 40, and the measurement unit 2 can transmit the read result to the external device. When the operating time of the filter element 20 has elapsed for a certain period of time, the external device provides a display prompting replacement of the filter element 20. The filter element 20 after replacement is provided with the IC tag 40 different from that of the filter element 20 prior to the replacement, and the operating time of the filter element 20 after the replacement is measured by reading the IC tag 40. In addition, when, for example, an imitation in which the IC tag 40 is not provided is used as the filter element after replacement, needless to say, the IC tag 40 cannot be read. The external device can perform error display or disable the operation of the filter device. For example, by reading the IC tag 40 provided on the filter element 20 after the replacement, the external device can determine that a filter element other than the predetermined filter element is provided.

According to the present embodiment, since the measurement unit 2 includes the differential pressure detection unit 60 and the antenna unit 51, the differential pressure detection unit 60 and the antenna 51a can be provided in the return filter 1 by simply mounting the measurement unit 2 to the return filter 1. In addition, since the configurations of the case 50 and the differential pressure detection unit 60 do not change from the conventional differential pressure detection device, not only the detection of the differential pressure between the space S1 and the space S2 but also reading the IC tag 40 provided in the filter element 20 is possible by only replacing the conventional differential pressure detection device with the measurement unit 2. In particular, since the differential pressure detection unit 60 and the antenna unit 51 are disposed at different positions, the respective function of the differential pressure detection unit 60 and function of the antenna unit 51 are not limited.

In addition, with the present embodiment, the antenna 51a is exposed from the opening on the distal end side (the end face 50m side) of the measurement unit 2. Therefore, disposing the measurement unit 2 in the hole 31a allows exposing the antenna 51a from the opening on the inner peripheral side of the hole 31a and accurately reading recording information of the IC tag 40 even with the metallic head 30. Furthermore, since the IC tag 40 and the antenna 51a are adjacent to one another, the IC tag 40 and the antenna 51a can be disposed as close as possible, and the recording information of the IC tag 40 can be accurately read even with the use of an IC tag (for example, an HF band) having a short transmission distance (a detection distance).

In addition, according to the present embodiment, the antenna unit 51 overlaps with the magnetic field detection element 61c when viewed along the center axis ax2, and thus the measurement unit 2 can be downsized.

Note that, although the plate 24 is made of the resin in the present embodiment, the material of the plate 24 is not limited to the resin. The material of the plate 24 only needs to have high corrosion resistance, and may be, for example, a metal such as stainless steel. When the plate 24 is made of metal, it is preferred to expose an end face of the IC tag 40 from the plate 24 or form an opening in the plate 24 from which the IC tag 40 is exposed and close the opening with, for example, a resin.

Note that in the present embodiment, the substrate 55 and the substrate 61b are provided in the measurement unit 2, but the substrate 55 is not essential. In a case where the substrate 55 is not provided, the antenna wire 54 is bent in a substantially U shape inside the hole 50b, and an end not provided on the antenna unit 51 is provided on the substrate 61b.

In addition, in the present embodiment, when viewed along the center axis ax2, the antenna unit 51 (the antenna 51a) overlaps with the magnetic field detection element 61c, but when viewed along the center axis ax2, the antenna unit 51 need not overlap with the magnetic field detection element 61c. For example, the antenna unit 51 may be reduced in size and the hole 50a may be configured so as not to overlap with the hole 50e when viewed along the center axis ax2, and the bottom surface of the hole 50e may open to the end face 50m. However, to downsize the measurement unit 2, when viewed along the center axis ax2, the antenna unit 51 preferably overlaps with a temperature detection element 92.

In addition, in the present embodiment, the measurement unit 2 is provided on the return filter 1, which is an example of the filter device, but the measurement unit 2 is provided not limited to the return filter 1. For example, the measurement unit 2 may be provided in various filter devices having filtration members. The filter device also includes, for example, an air breather. The air breather has two filtration members provided concentrically. When the measurement unit 2 is provided in the air breather, the differential pressure detection unit 60 measures a differential pressure between the pressure inside the inner filtration member and an atmospheric pressure.

Second Embodiment

The second embodiment of the present invention has a configuration in which a pressure gauge is provided in a measurement unit. Hereinafter, a measurement unit 3 according to the second embodiment will be described. The measurement unit 3 is provided on the return filter 1, similarly to the measurement unit 2. Note that the same components as those in the first embodiment are denoted by the same reference numerals, and descriptions thereof will be omitted.

Figure 5:
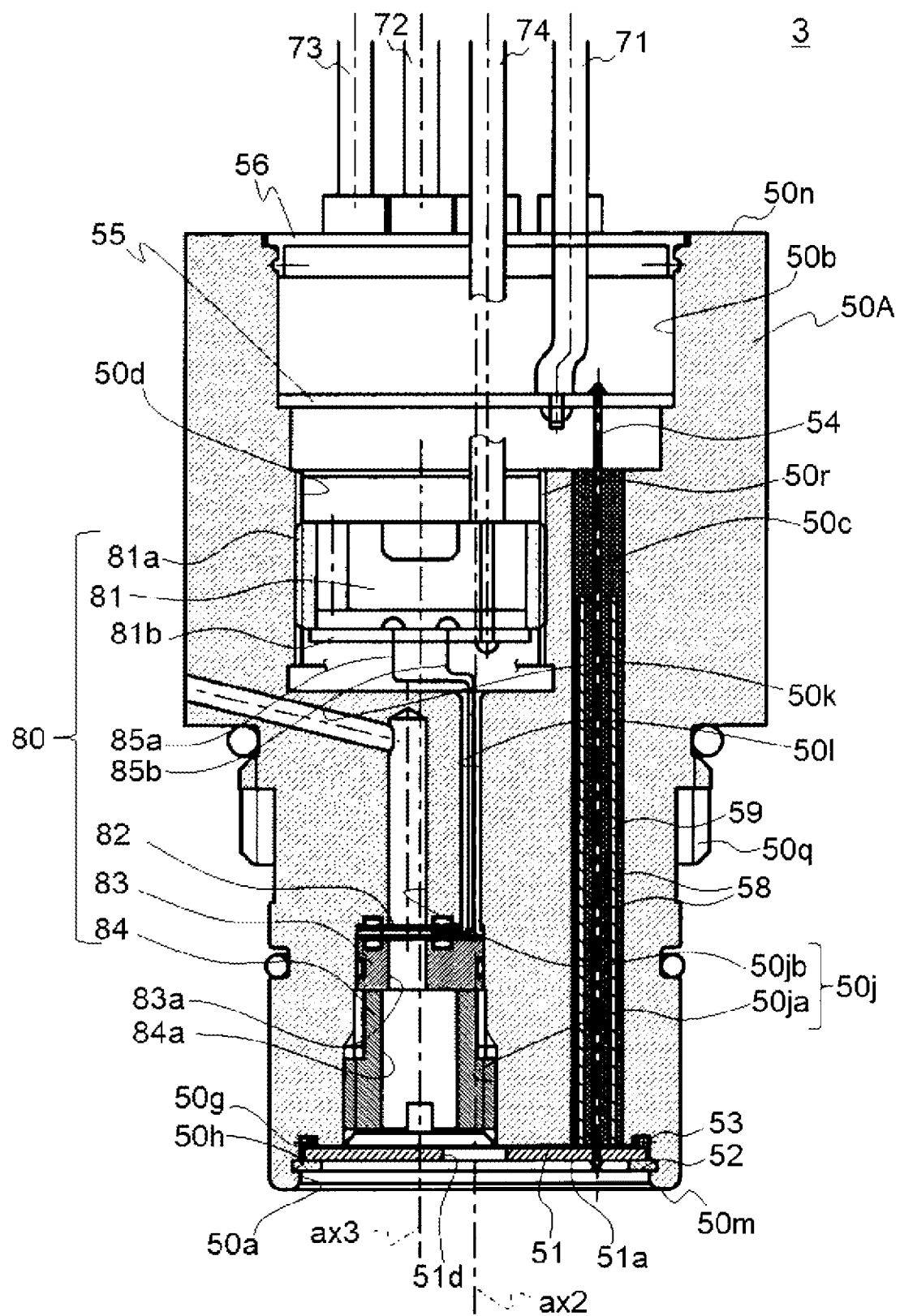
FIG. 5 is a cross-sectional view illustrating an outline of a measurement unit 3 as an embodiment of the present invention.

FIG. 5 is a cross-sectional view illustrating an outline of the measurement unit 3. FIG. 5 partially omits hatching indicating a cross section.

The measurement unit 3 mainly includes a case 50A, the antenna unit 51, and a pressure detection unit 80. The pressure detection unit 80 mainly includes a detection unit 81, a diaphragm portion 82, a fixing member 83, and a mounting member 84.

The case 50A has a substantially columnar shape, and is provided with the antenna 51a and a strain gauge 82c (described in detail later, equivalent to the sensor of the present invention).

Additionally, the case 50A has the hole 50a, the hole 50b, the holes 50c, the hole 50d, a hole 50j, a hole 50k (equivalent to a seventh hole of the present invention), and a hole 50j (equivalent to an eighth hole of the present invention). The hole 50k penetrates the case 50A in the radial direction, and has both ends opening to the vicinity of the bottom surface of the hole 50j and an outer peripheral surface of the case 50A. The hole 50j opens to the hole 50a. The hole 50l has both ends opening to the hole 50d and the hole 50j.

When viewed along the center axis ax2 of the case, the hole 50c is disposed not overlapping with the hole 50j, and the hole 50c is disposed not overlapping with the hole 50l.

The detection unit 81 is provided in the hole 50d. The detection unit 81 has a substantially cylindrical shape, and an external thread portion 81a is formed around the detection unit 81. By screwing the external thread portion 81a into the internal thread portion 50r formed in the hole 50d, the detection unit 81 is provided inside the hole 50d, and a height of the detection unit 81 (a position in the direction along the center axis ax2) can be adjusted. A substrate 81b (equivalent to the first substrate of the present invention) is provided on a distal end side (the end face 50m side) of the detection unit 81. In other words, the substrate 81b is provided in the hole 50d.

The hole 50j has a hole 50ja (equivalent to the fifth hole of the present invention) having one end opening to the hole 50a and a hole 50jb (equivalent to the sixth hole of the present invention) provided on the back side (the end face 50n side) of the hole 50ja and having one end opening to the hole 50ja. The diaphragm portion 82, the fixing member 83, and the mounting member 84 are mainly provided inside the hole 50ja.

The diaphragm portion 82 is provided on a bottom surface of the hole 50ja. The fixing member 83 is a substantially columnar-shaped member and abuts on the diaphragm portion 82. The mounting member 84 is a substantially columnar-shaped member and abuts on the fixing member 83. By screwing the external thread portion formed on the outer peripheral surface of the fixing member 83 into the internal thread portion 50r formed on the inner peripheral surface of the hole 50ja, the diaphragm portion 82 and the fixing member 83 are provided inside the hole 50ja, and the heights of the diaphragm portion 82 and the fixing member 83 can be adjusted. When the mounting member 84 presses up the diaphragm portion 82 and the fixing member 83, the fixing member 83 is pressed against the diaphragm portion 82, and the diaphragm portion 82 is pressed against the bottom surface of the hole 50ja.

The fixing member 83 has a hole 83a substantially along a center axis ax3 of the hole 50ja, and the hole 83a is provided so as to penetrate the fixing member 83. Furthermore, the mounting member 84 has a hole 84a substantially along the center axis ax3, and the hole 84a is provided so as to penetrate the mounting member 84. As a result, the end face on the distal end side (the end face 50m side) of the diaphragm portion 82 communicates with the space S2 (see FIG. 1) via the hole 83a, the hole 84a, the hole 51d, and the hole 50a, and the liquid after filtration is guided to the end face on the distal end side of the diaphragm portion 82. The diaphragm portion 82 will be described in detail later.

The hole 50jb has one end opening to the bottom surface of the hole 50ja. One end of the hole 50k opens to the hole 50jb, and thus an end face on the back side (the end face 50n side) of the diaphragm portion 82 communicates with the external space of the measurement unit 3.

When viewed along the center axes ax2 and ax3, the hole 83a and the hole 84a are provided at a position overlapping with the hole 50jb Thus, the diaphragm portion 82 can be deformed by a minute amount according to the pressure in the space S2 to the atmospheric pressure.

The hole 50l is a hole substantially parallel to the hole 50j, and has one end opening to the hole 50ja and the other end opening to the hole 50d. When viewed along the center axis ax2, the hole 50j does not overlap with the hole 50l. Cables 85a and 85b are provided inside the hole 50l, and the cables 85a and 85b transmit electrical signals generated in the strain gauge 82c (described in detail later) to the detection unit 81 (the substrate 81b).

Figure 6:
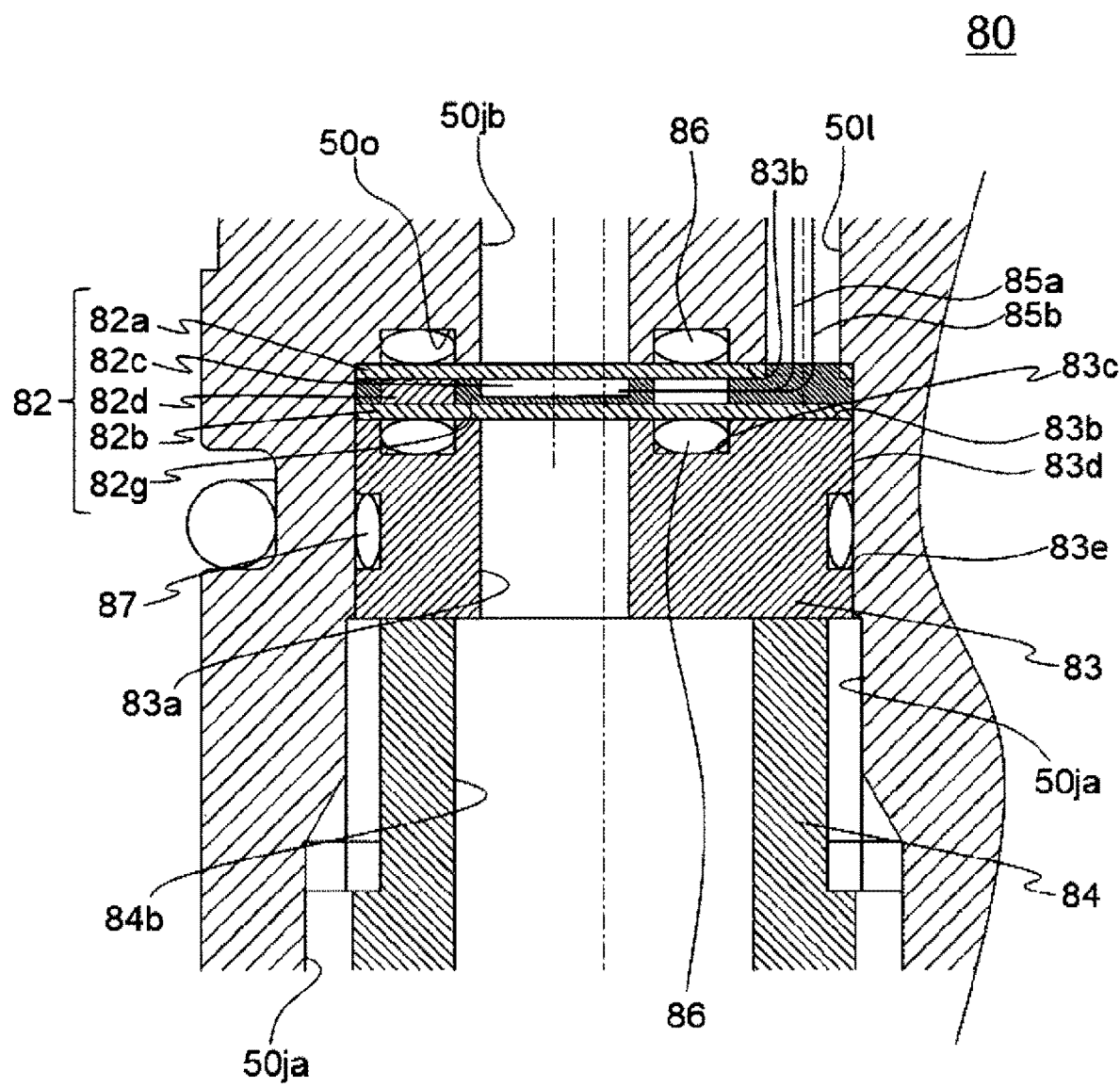
FIG. 6 is a cross-sectional view illustrating an outline of a pressure detection unit 80.
Figure 7:
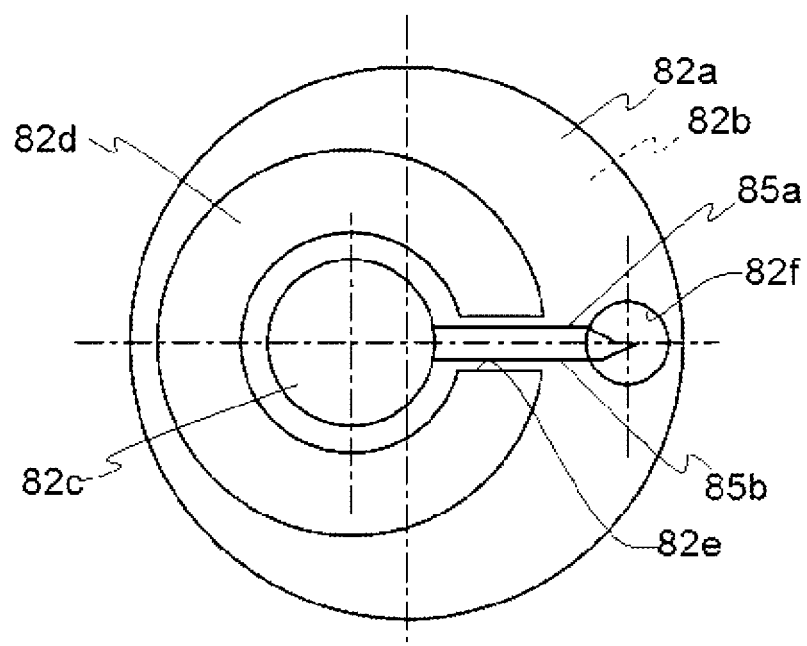
FIG. 7 is a plan view of a diaphragm portion 82.

FIG. 6 is a cross-sectional view illustrating an outline of the pressure detection unit 80. FIG. 6 partially omits hatching indicating a cross section. FIG. 7 is a plan view of the diaphragm portion 82. In FIG. 7, the main parts of the diaphragm portion 82 are transparent.

The diaphragm portion 82 has a substantially circular plate shape, and is sandwiched between the bottom surface of the hole 50ja and the fixing member 83. The diaphragm portion 82 mainly includes plates 82a and 82b, the strain gauge 82c, and an annular member 82d.

The plates 82a and 82b are made of metal (for example, stainless steel), and are provided such that the strain gauges 82c and the annular member 82d are sandwiched between both sides. Here, the "plate-shaped member" refers to a member having a thickness with which, for example, bending and winding are difficult (for example, approximately 0.1 mm or more in the case of a metal plate), and thicker than a sheet and a film that can be bent or wound. In the present embodiment, the thicknesses of the plates 82a and 82b are approximately from 0.2 mm to approximately 0.3 mm. This allows a minute amount of deformation when subjected to pressure from the liquid, and can maintain the strength of the diaphragm portion 82.

The strain gauge 82c is provided on the plate 82a or the plate 82b (the plate 82a in the present embodiment). The strain gauge 82c is provided with a metal wire therein, the metal wire expands and contracts in accordance with the extension and shrinkage of a measured object (here, the plate 82a or the plate 82b), and a change in an electrical resistance of the metal wire is measured to obtain the extension and shrinkage (a strain) of the measured object. The cables 85a aa 85b are connected to the metal wire. The diameter of the strain gauge 82c is preferably less than or equal to the diameters of the hole 50ja and the hole 83a.

The strain gauge 82c is provided in a hollow portion of the annular member 82d. The annular member 82d is a plate-shaped member having a substantially circular ring shape, and has a thickness thicker than the strain gauge 82c. Accordingly, an interval between the plate 82a and the plate 82b is wider than the thickness of the strain gauge 82c. This allows reducing the strain gauge 82c from collapsing and accurately detecting amounts of deformation of the plate 82a and the plate 82b by the strain gauge 82c.

In the annular member 82d, a notch 82e through which the cables 85a and 85b pass is formed along the radial direction of the annular member 82d. The cables 85a and 85b are guided to outside the diaphragm portion 82 via the notch 82e and a hole 82f formed in the plate 82a.

A filling member 82g is filled between the plate 82a and the plate 82b. Although the thickness of the strain gauge 82c is thinner than the thickness of the annular member 82d (the interval between the plate 82a and the plate 82b), filling the filling member 82g between the plate 82a and the plate 82b allows detecting the strain of the plate 82b, in addition to the strain of the plate 82a by the strain gauge 82c. The filling member 82g is a polymer material composed of a high molecular substance (typically having a molecular weight of 10000 or more), and contains, for example, resin and rubber.

A groove 50o is provided in the case 50A so as to surround the hole 50jb. In addition, a groove 83c is provided in a surface 83b abutting on the diaphragm portion 82 of the fixing member 83 so as to surround the hole 83a. Elastically deformable annular packings 86 (for example, O-rings) are provided in a groove 11c and the groove 83c. Additionally, a groove 83e is provided in a side surface 83d of the fixing member 83, and an elastically deformable annular packing 87 (for example, an O-ring) is provided in the groove 83e. The annular packings 86 and 87 avoid a liquid to leak from around the diaphragm portion 82.

The description will now return to FIG. 5. The detection result of the strain gauges 82c is transmitted to the substrate 81b by the cables 85a and 85b and is output to outside the measurement unit 2 via the signal line 74 having one end provided on the substrate 81b.

According to the present embodiment, since the measurement unit 3 includes the pressure detection unit 80 and the antenna unit 51, the pressure detection unit 80 and the antenna 51a can be provided in the return filter by simply mounting the measurement unit 2 to the return filter 1. In addition, since the configurations of the case 50A and the pressure detection unit 80 do not change from the conventional differential pressure detection device, not only the detection of the pressure but also reading the IC tag 40 provided in the filter element 20 is possible by replacing the conventional differential pressure detection device with the measurement unit 3.

Note that in the present embodiment, the substrate 55 and the substrate 81b are provided in the measurement unit 3, but it is only necessary to provide either one of the substrate 55 and the substrate 81b. In a case where the substrate 55 is not provided, it is only necessary that the antenna wire 54 is bent in a substantially U shape inside the hole 50b and an end not provided on the antenna unit 51 is provided on the substrate 81b. In a case where the substrate 81b is not provided, it is only necessary to provide ends on the side not provided on the strain gauge 82c of the cables 85a and 85b on the substrate 55.

In addition, in the present embodiment, when viewed along the center axis ax2, the antenna unit 51 (the antenna 51a) overlaps with the diaphragm portion 82 (the strain gauge 82c), but when viewed along the center axis ax2, the antenna unit 51 need not overlap with the diaphragm portion 82. For example, the antenna unit 51 may be reduced in size and the hole 50a is configured to so as not to overlap with the hole 50j when viewed along the center axis ax2, and the bottom surface of the hole 50j may open to the end face 50m. However, to downsize the measurement unit 3, when viewed along the center axis ax2, the antenna unit 51 preferably overlaps with the diaphragm portion 82.

Third Embodiment

The third embodiment of the present invention has a configuration in which a temperature detection element is provided in a measurement unit. Hereinafter, a measurement unit 4 according to the third embodiment will be described. The measurement unit 4 is provided on the return filter 1, similarly to the measurement unit 2. Note that the same components as those in the first embodiment are denoted by the same reference numerals, and descriptions thereof will be omitted.

Figure 8:
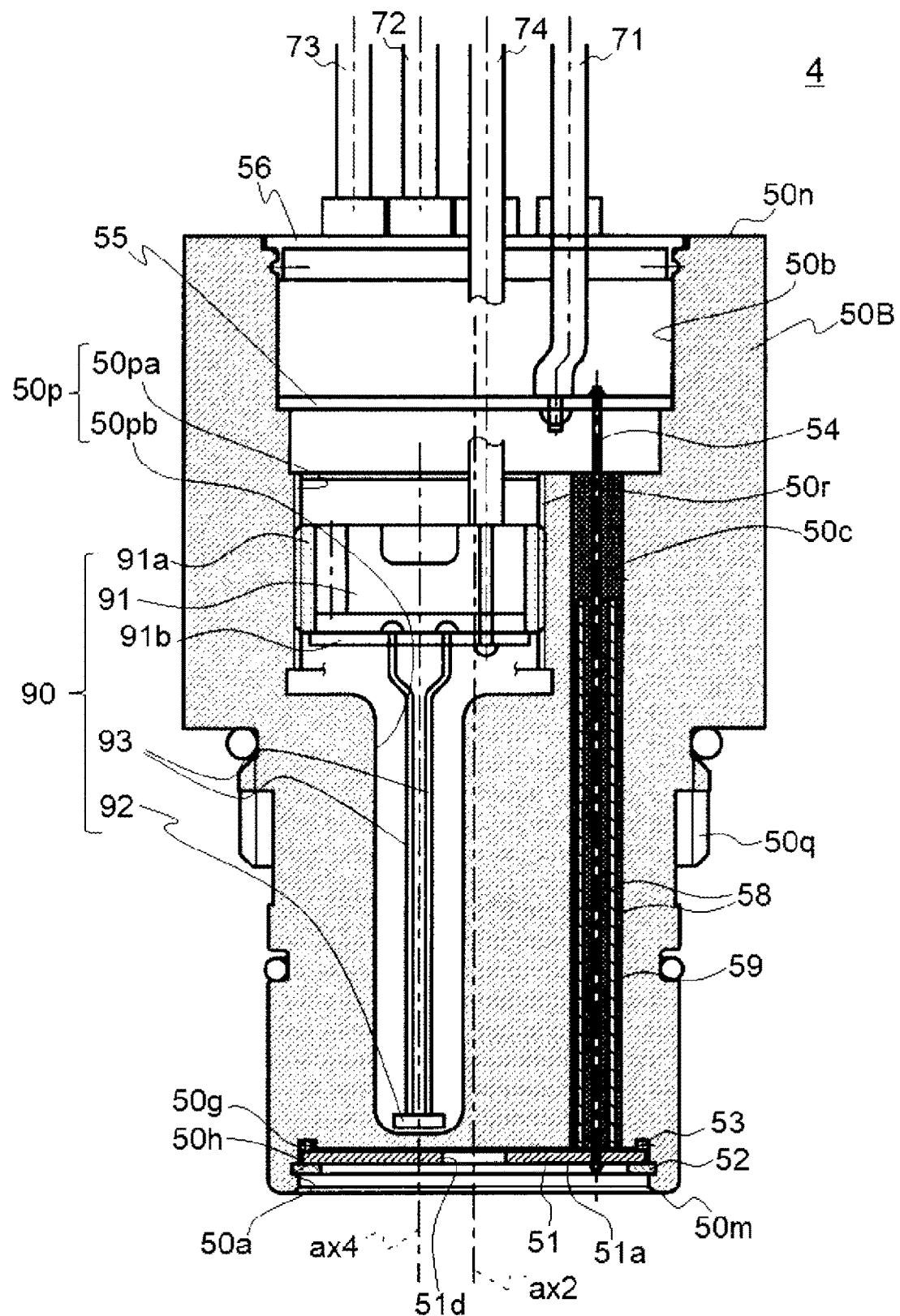
FIG. 8 is a cross-sectional view illustrating an outline of a measurement unit 4 as an embodiment of the present invention.

FIG. 8 is a cross-sectional view illustrating an outline of the measurement unit 4. FIG. 8 partially omits hatching indicating a cross section.

The measurement unit 4 mainly includes a case 50B, the antenna unit 51, and a temperature detection unit 90. The temperature detection unit 90 mainly includes a detection unit 91, the temperature detection element 92, and cables 93.

The case 50B has a substantially columnar shape, and is provided with the antenna 51a and the temperature detection element 92 (equivalent to the sensor of the present invention).

Additionally, the case 50B has the hole 50a, the hole 50b, the hole 50c, and a hole 50p (equivalent to the fourth hole of the present invention). The hole 50p opens to the hole 50b. When viewed along the center axis ax2 of the case, the hole 50c and the hole 50p are disposed so as not to overlap.

The hole 50p includes a hole 50pa opening to the hole 50b and a hole 50pb provided on the back side (the end face 50m side) of the hole 50pa and opening to the hole 50pa. The hole 50pa and the hole 50pb have center axes that are substantially matched, and a center axis ax4 is substantially parallel to the center axis ax2.

The detection unit 91 is provided in the hole 50pa. The detection unit 91 has a substantially cylindrical shape, and an external thread portion 91a is formed around the detection unit 91. By screwing the external thread portion 91a into an internal thread portion formed in the hole 50pa, the detection unit 91 is provided inside the hole 50pa, and a height of the detection unit 91 can be adjusted. A substrate 91b is provided on a distal end side (the end face 50m side) of the detection unit 91. In other words, the substrate 91b (equivalent to the first substrate of the present invention) is provided in the hole 50d.

The bottom surface of the hole 50pb is adjacent to the bottom surface of the hole 50a. The temperature detection element 92 is provided in the vicinity of the bottom surface of the hole 50pb. The temperature detection element 92 measures a temperature of a liquid flowing into the hole 50a. Note that, as the temperature detection element 92, a thermistor, such as an NTC thermistor and a PTC thermistor, or various thermocouples can be used.

The cables 93 are provided in the hole 50p. The cable 93 has one end provided on the temperature detection element 92 and the other end provided on the substrate 91b. The cables 93 transmit electrical signals generated in the temperature detection element 92 to the detection unit 91. The detection result of the temperature detection element 92 is output to outside the measurement unit 2 via the signal line 74 provided on the substrate 91b.

According to the present embodiment, since the measurement unit 4 includes the temperature detection unit 90 and the antenna unit 51, the temperature detection unit 90 and the antenna 51a can be provided in the return filter by simply mounting the measurement unit 4 to the return filter 1. In addition, since the configurations of the case 50B and the temperature detection unit 90 do not change from the conventional differential pressure detection device, not only the detection of the pressure but also reading the IC tag 40 provided in the filter element 20 is possible by replacing the conventional differential pressure detection device with the measurement unit 4.

Note that in the present embodiment, the diameter of the hole 50a is large, and the hole 50a overlaps with the hole 50p when viewed along the center axis ax2. However, when viewed along the center axis ax2, the hole 50a and the hole 50p may be provided in the case 50B such that the hole 50a does not overlap with the hole 50p. That is, in the present embodiment, when viewed along the center axis ax2, the antenna unit 51 (the antenna 51a) overlaps with the temperature detection element 92, but when viewed along the center axis ax2, the antenna unit 51 need not overlap with the temperature detection element 92. At this time, the bottom surface of the hole 50p is preferably adjacent to the end face 50m. However, to downsize the measurement unit 4, when viewed along the center axis ax2, the antenna unit 51 preferably overlaps with the temperature detection element 92.

Additionally, in the present embodiment, the substrate 55 and the substrate 91b are provided in the measurement unit 4, but it is only necessary to provide either one of the substrate 55 and the substrate 91b. In a case where the substrate 55 is not provided, it is only necessary that the antenna wire 54 is bent in a substantially U shape inside the hole 50b and an end not provided on the antenna unit 51 is provided on the substrate 91b. In a case where the substrate 91b is not provided, it is only necessary to provide ends on the side not provided on the temperature detection element 92 of the cables 93 on the substrate 55.

Fourth Embodiment

The fourth embodiment of the present invention has a configuration in which a configuration of a differential pressure detection unit provided in a measurement unit is different. Hereinafter, a measurement unit 5 according to the fourth embodiment will be described. The measurement unit 5 is provided on the return filter 1, similarly to the measurement unit 2. Note that the same components as those in the first embodiment are denoted by the same reference numerals, and descriptions thereof will be omitted.

Figure 9:
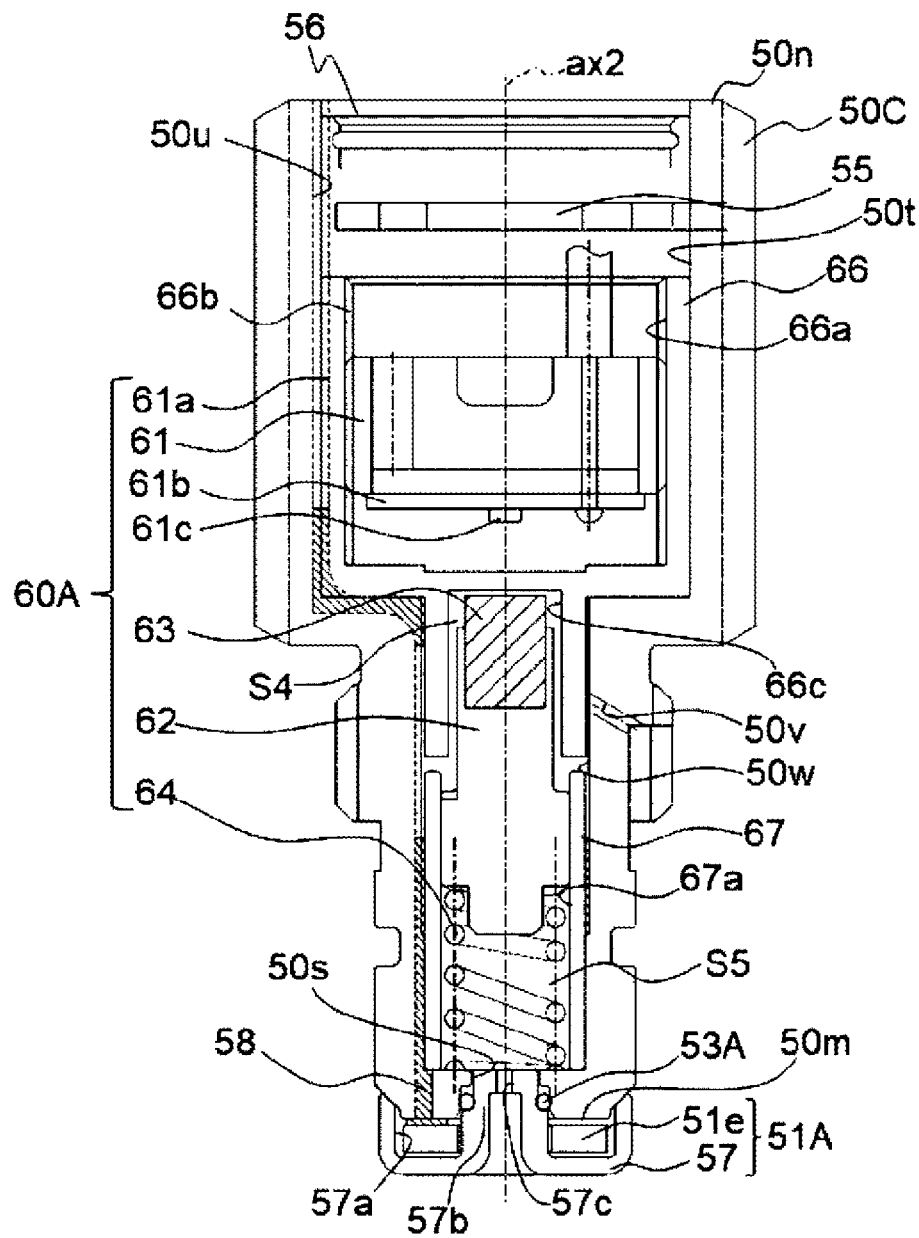
FIG. 9 is a cross-sectional view illustrating an outline of a measurement unit 5 as an embodiment of the present invention.

FIG. 9 is a cross-sectional view illustrating an outline of the measurement unit 5. FIG. 5 partially omits hatching indicating a cross section. Further, FIG. 9 partially omits illustration of cables.

The measurement unit 5 mainly includes a case 50C, an antenna unit 51A, the substrate 55, a cover 57, and a differential pressure detection unit 60A.

The case 50C has a substantially tubular shape, and has a hole 50s, a hole 50t, a hole 50u, a hole 50v, and a hole 50w. The hole 50w opens to the hole 50t. The hole 50s has one end opening to the bottom surface of the hole 50w and the other end opening to the end face 50m to communicate between the hole 50t and an external space of the measurement unit 5. The hole 50v penetrates the case 50C in the radial direction, and has both ends opening to the hole 50w and an outer peripheral surface of the case 50C.

The substrate 55 is provided in the hole 50t, and the differential pressure detection unit 60A is provided in the holes 50t and 50w.

The antenna unit 51A has a substantially circular ring shape and is provided at the distal end of the case 50C. Here, the end face 50n side of the case 50C is referred to as a root side, and the end face 50m side of the case 50C on the side opposite to the root side is referred to as a distal end side.

The antenna unit 51A mainly includes an antenna (for example, an antenna coil pattern) 50e and the cover 57. An antenna 51e is a plate-shaped member having a substantially circular plate shape in plan view, and can communicate with the IC tag 40. One end of an antenna wire (not illustrated) is provided on the antenna unit 51A. This antenna wire is provided inside the hole 50u, and the other end of the antenna wire is provided on the substrate 55.

The substrate 55 is provided inside the hole 50t and mounts, for example, an IC chip (not illustrated). When the substrate 55 receives a radio wave from the IC tag 40, the substrate 55 generates a reception signal and outputs a signal via a signal line (not illustrated).

The filler 58 is provided inside the hole 50u so as to cover the antenna wire. The filler 58 is, for example, an adhesive having a high polymer compound as a main component. Filling the inside of the hole 50u with the filler 58 in this manner avoids a fuel to leak from the case 50C.

The cover 57 is formed of an elastically deformable material, and internally includes a substantially bottomed tubular insertion portion 57a in which the antenna 51e is provided. Additionally, the cover 57 includes a protrusion portion 57b inserted into an inside of a hole 57d at the center of the insertion portion 57a.

The insertion portion 57a has an open upper end, and insertion of the protrusion portion 57b into the hole 50s covers the upper end of the insertion portion 57a with the case 50C. In this way, the antenna 51e is disposed adjacent to the end face 50m, and a contact of hydraulic oil with the antenna 51e can be avoided. Further, since a sealing member (for example, an o ring) 53A is provided between the protrusion portion 57b and the hole 57d, the antenna unit 51A is fixed to the distal end of the case 50C.

A mounting member 66 is provided in the holes 50t and 50w. The mounting member 66 includes a hole 66a provided on the root side (the substrate 55 side), and a hole 66c provided on the distal end side (the antenna unit 51A side). The detection unit 61 of the differential pressure detection unit 60A is provided in the hole 66a.

The differential pressure detection unit 60A mainly includes the detection unit 61, the spool 62, the magnet 63, and the elastic member 64.

By screwing the external thread portion 61a, which is formed around the detection unit 61, into an internal thread portion 66b formed in the hole 66a, the detection unit 61 is provided inside the hole 66a, and a height of the detection unit 61 (a position in the direction along the center axis ax2) can be adjusted.

The substrate 61b is provided on the distal end side of the detection unit 61. The magnetic field detection element 61c is provided on the substrate 61b. In other words, the substrate 61b and the magnetic field detection element 61c are provided in the hole 50t via the mounting member 66.

The spool 62 slides along an inner peripheral surface 67a of a sliding member 67 of the tubular portion provided inside the hole 50w.

The elastic member 64 is, for example, a coil spring, and has one end provided on the spool 62 and the other end provided on the bottom surface of the hole 50w. The elastic member 64 urges the force in the direction of pushing up the spool 62 on the spool 62.

A space between the bottom surface of the hole 50w and the spool 62 communicates with the space S1 (see FIG. 1) via a hole 57c of the cover 57. The space between the spool 62 and the hole 66c communicates with the space S2 (see FIG. 1) via the hole 50v.

The magnet 63 is provided on a surface facing the bottom surface of the hole 50w of the spool 62, that is, on the surface on the detection unit 61 side of the spool 62. When viewed along the center axis ax2 of the case 50C, the magnetic field detection element 61c is provided at a position overlapping with the magnet 63.

When pressure in the space S2 (see FIG. 1) increases due to, for example, clogging of the filtration member 21, the spool 62 moves to the lower side in FIG. 9 against the urging force of the elastic member 64. In accordance with this, the magnet 63 also moves toward the lower side in FIG. 9, and the magnet 63 moves away from the magnetic field detection element 61c. The magnetic field detection element 61c detects a change in magnetic flux density due to the movement of the magnet 63.

According to the present embodiment, since the measurement unit 5 includes the differential pressure detection unit 60A and the antenna unit 51A, the differential pressure detection unit 60A and the antenna can be provided in the return filter 1 by simply mounting the measurement unit 5 to the return filter 1. In addition, since the configurations of the case 50C and the differential pressure detection unit 60A do not change from the conventional differential pressure detection device, not only the detection of the differential pressure between the space S1 and the space S2 but also reading the IC tag 40 provided in the filter element 20 is possible by replacing the conventional differential pressure detection device with the measurement unit 5.

In addition, according to the present embodiment, the antenna unit 51A is covered with the cover 57 and the antenna unit 51A does not contact the hydraulic oil, and thus the IC tag 40 is easily read.

Fifth Embodiment

The fifth embodiment of the present invention is a configuration in which a filter element has a substantially plate-shaped IC tag. Hereinafter, a return filter 6 according to the fifth embodiment will be described. Note that the same components as those in the first embodiment are denoted by the same reference numerals, and descriptions thereof will be omitted.

Figure 10:
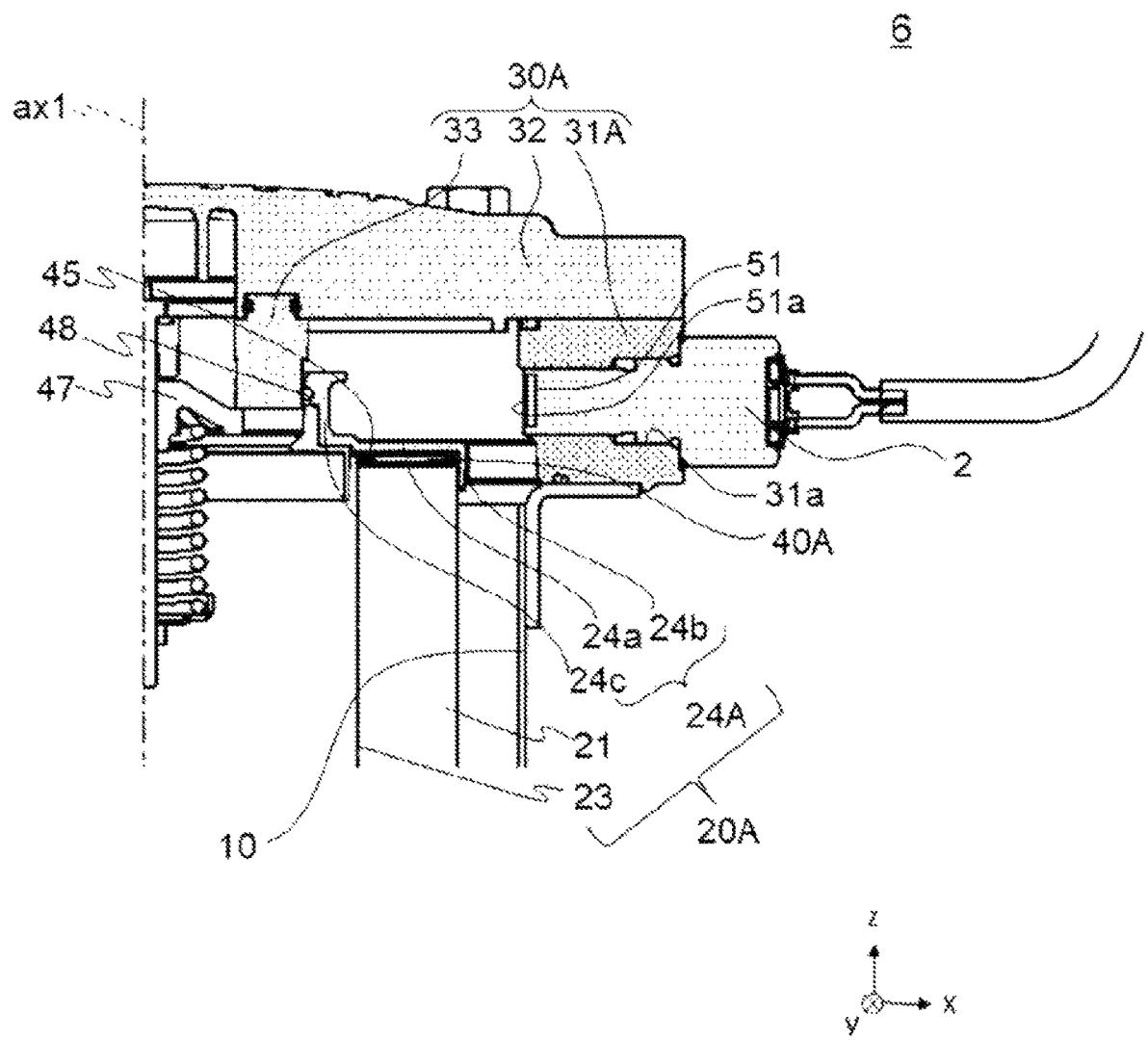
FIG. 10 is a cross-sectional view of a return filter 6 as an embodiment of the present invention and is a partially enlarged view.

Differences between the return filter 6 according to the fourth embodiment and the return filter 1 according to the present embodiment are only a shape of the IC tag and a shape of a lid body. FIG. 10 is a cross-sectional view of the return filter 6 and is a partially enlarged view. FIG. 10 partially omits hatching indicating a cross section. FIG. 10 omits detailed illustration of the internal structure of the measurement unit 2.

The return filter 6 is provided inside the tank and mainly includes the filter case 10, a filter element 20A, a head 30A, an IC tag 40A, and the measurement unit 2.

The filter element 20A mainly includes the filtration member 21, the inner tube 23, a plate 24A, the plate 25 (not illustrated in FIG. 11), and the IC tag 40A. A difference between the plate 24 and the plate 24A is presence/absence of the protruding portion 24d, and the plate 24A does not have the protruding portion 24d.

The adhesive 45 is sealed between the filtration member 21 and the plate 24A, and the filtration member 21 and the plate 24A are bonded with the adhesive 45. In addition, the IC tag 40A is provided on the plate 24A (here, the plate-shaped portion 24a) with the adhesive 45.

Figure 11:
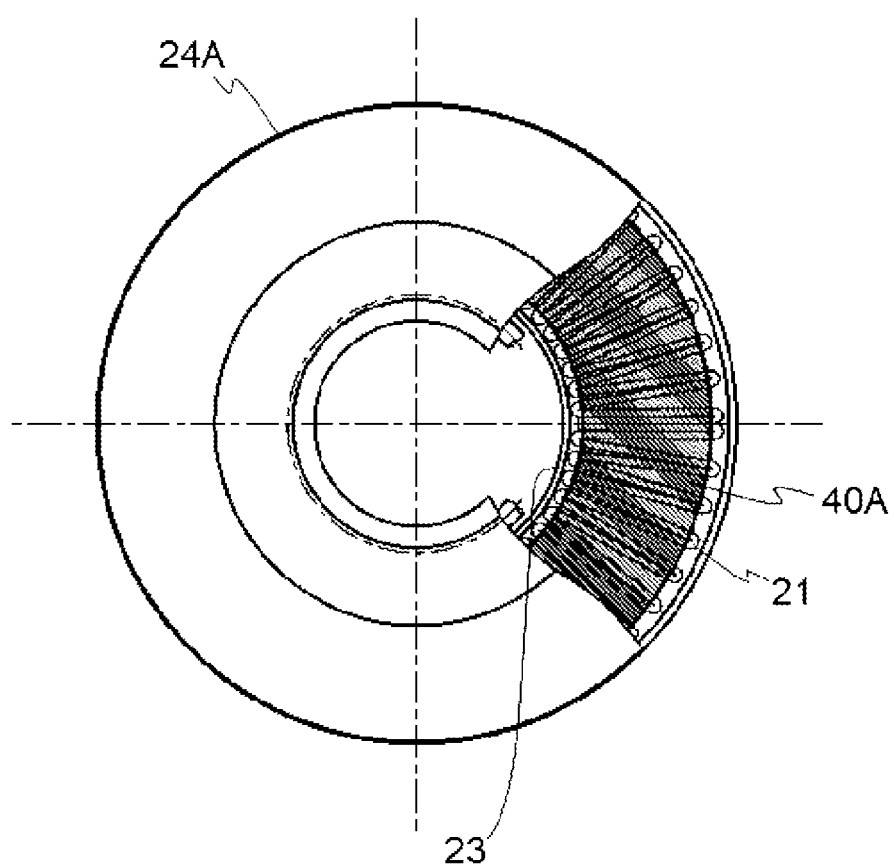
FIG. 11 is a plan view of a filter element 20A and is a drawing in which a plate 24A is partially cut off.

FIG. 11 is a plan view of the filter element 20A and is a drawing in which the plate 24A is partially cut off.

The IC tag 40A has a substantially hollow circular plate shape. The IC tag 40A has an inner diameter greater than the inner diameter of the filtration member 21. Accordingly, the IC tag 40A is provided inside the adhesive 45, which bonds the filtration member 21 and the plate 24 together.

The description will now return to FIG. 10. Into the hole 31a, which penetrates the side surface of a tubular portion 31A, the measurement unit 2 is inserted. The antenna 51a is exposed from an opening on the inner peripheral surface side of the hole 31a. The tubular portion 31A differs from the tubular portion 31 in that the projection 31b is not provided.

With the present embodiment, because the IC tag 40A has the substantially hollow circular plate shape, positioning of the IC tag 40A with the antenna 51a is unnecessary, and the assembly of the return filter 6 is easy.

Note that, in the present embodiment, the measurement unit 2 is provided in the tubular portion 31A, but the measurement unit 2 is not limited to be provided in the tubular portion 31A. For example, the measurement unit 2 may be provided on the cover 32. In the present embodiment, since positioning of the IC tag 40A and the antenna 51a is unnecessary, the measurement unit 2 can be provided at various positions. However, when the measurement unit 2 is provided on the cover 32, the center axis ax2 of the measurement unit 2 is preferably substantially parallel to the center axis ax1 to cause the IC tag 40A to face the antenna 51a.

The embodiments of the invention are described above in detail with reference to the drawings. However, specific configurations are not limited to the embodiments and also include changes in design or the like without departing from the gist of the invention. For example, in the examples described above, detailed description is made to facilitate understanding of the present invention, and the examples are not necessarily limited to examples including all the configurations described above. In addition, the configuration of an embodiment can be replaced partially with the configurations of other embodiments. In addition, addition, deletion, replacement or the like of other configurations can be made on the configurations of the embodiments.

In addition, the term "substantially" is not to be understood as merely being strictly the same, and is a concept that includes errors and modifications to an extent that does not result in loss in identity. For example, the "substantially cylindrical shape" is a concept that includes a case where, for example, the shape can be placed in the same category as the cylindrical shape, and is not strictly limited to the cylindrical shape. Further, simple expressions such as orthogonal, parallel, and identical are not to be understood as merely being strictly, for example, orthogonal, parallel, and identical, and include being, for example, substantially parallel, substantially orthogonal, and substantially identical.

In addition, the term "vicinity" means to include a range of regions (which can be determined as desired) near a position serving as a reference. For example, the term "a vicinity of an end" refers to a range of regions in the vicinity of the end, and is a concept indicating that the end may or need not be included.

REFERENCE SIGNS LIST 1, 6: Return filter
2, 3, 4, 5: Measurement unit

10: Filter case
11: Bottom surface
11c: Groove
12: Outflow portion
12a: Cylindrical portion
12b: Back pressure valve
12c: First cylindrical portion
12d: Second cylindrical portion
12e: Bottom surface
12f: Outflow hole
12g: Outflow hole
12h: Valve body
12i: Elastic member
12j: Valve seat
13: Mounting member
20, 20A: Filter element
21: Filtration member
23: Inner tube
24, 24A, 25: Plate
24a: Plate-shaped portion
24b, 24c: Tubular portion
24d: Protruding portion
25a: Recessed portion
25b: Hole
30, 30A: Head
31: Tubular portion
31A: Tubular portion
31a: Hole
31b: Projection
32: Cover
33: Mounting portion
34: Flow path
35: Hole
40, 40A: IC tag
45: Adhesive
46, 48: Sealing member
47: Valve
50, 50A, 50B, 50C: Case
50a, 50b, 50d, 50e, 50j, 50ja, 50jb, 50p, 50pa, 50pb, 50t, 50w: Hole
50c, 50f, 50k, 50l, 50s, 50u, 50v: Hole
50g: Recessed portion
50h: Recessed portion
50m, 50n: End face
50o: Groove
50q: External thread portion
50r: Internal thread portion
51, 51A: Antenna unit
51a, 51e: Antenna
51b, 51c: Antenna terminal
51d: Hole
52: Retainer ring
53: Sealing member
54: Antenna wire
55: Substrate
56, 57: Cover
57a: Inserted portion
57b: Protrusion portion
57c: Hole
57d: Hole
58: Filler
59: Insulating pipe
60, 60A: Differential pressure detection unit
61: Detection unit
61a: External thread portion
61b: Substrate
61c: Magnetic field detection element
62: Spool
63: Magnet
64: Elastic member
65: E-ring
66: Mounting member
66a: Hole
66b: Internal thread portion
66c: Hole
67: Sliding member
67a: Inner peripheral surface
71: Signal line
72, 73: Power cable
74: Signal line
80: Pressure detection unit
81: Detection unit
81a: External thread portion
81b: Substrate
82: Diaphragm portion
82a, 82b: Plate
82c: Strain gauge
82d: Annular member
82e: Notch
82f: Hole
82g: Filling member
83: Fixing member
83a: Hole
83b: Surface
83c: Groove
83d: Side surface
83e: Groove
84: Mounting member
84a: Hole
85a, 85b: Cable
86, 87: Annular packing
90: Temperature detection unit
91: Detection unit
91a: External thread portion
91b: Substrate
92: Temperature detection element
93: Cable
100: Tank
100a: Hole

The invention claimed is:

1. A measurement unit comprising:
a case having a pillar shape;
an antenna unit that includes an antenna, the antenna being provided on the case and configured to communicate with an IC tag; and
a sensor provided in the case,
wherein:
the antenna unit is provided in a vicinity of a first end face as one end of the case;
the sensor is provided inside the case and a back side of the case with respect to the antenna unit;
the case has a first hole, a second hole, a third hole, and a fourth hole, the first hole opens at the first end face, the second hole opens at a second end face as an end face on a side opposite to the first end face, and the third hole is a through-hole having an end opening to the first hole and another end opening to the second hole;
when viewed along a center axis of the case, the third hole is non-overlapping with the fourth hole;
the antenna unit has a plate shape, and a wiring pattern as the antenna is formed on one surface of the antenna unit;
the antenna unit is provided in the first hole such that the antenna is exposed from an opening of the first hole;

an antenna wire having one end connected to the antenna unit is provided in the third hole; and at least the sensor or a first substrate to which the sensor is connected is disposed inside the fourth hole.

2. The measurement unit according to claim 1, wherein when viewed along a center axis of the case, the antenna unit overlaps with the sensor.

3. The measurement unit according to claim 1, comprising a cover covering an opening of the second hole, wherein a second substrate is provided in the second hole;

the antenna wire has another end provided on the second substrate;

the first substrate is provided in the fourth hole; and a power cable that penetrates the cover and supplies the first substrate and the second substrate with power is provided.

4. The measurement unit according to claim 1, wherein the case has a fifth hole and a sixth hole, the fifth hole opens to the first hole, and the sixth hole is a through-hole having an end opening at a side surface of the case and another end opening to a vicinity of a bottom surface of the fifth hole;

the antenna unit has a diameter same as an inner diameter of the first hole;

the antenna unit has a seventh hole that is a through-hole;

a spool and an elastic member are provided in the fifth hole, the spool is slidable inside the fifth hole and divides the fifth hole into a first space and a second space, and the elastic member urges a force in a direction heading from the first space to the second space on the spool;

a magnet is provided on a surface facing the bottom surface of the fifth hole of the spool;

the first substrate is provided in the fourth hole; and a magnetic field detection element as the sensor is provided on the first substrate, and the magnetic field detection element is provided at a position overlapping with the magnet when viewed along a center axis of the case.

5. The measurement unit according to claim 1, wherein the case has a fifth hole, a sixth hole, a seventh hole that is a through-hole, and an eighth hole that is a through-hole, the fifth hole opens to the first hole, the sixth hole opens to the fifth hole, the seventh hole communicates between a side surface of the case and the sixth hole, the eighth hole has an end opening to the fourth hole and another end opening to the fifth hole;

the antenna unit has a diameter a same as an inner diameter of the first hole;

the antenna unit has a nineth hole that is a through-hole;

a strain gauge as the sensor is provided on a bottom surface of the fifth hole; and in the eighth hole, a cable having one end connected to the strain gauge is provided.

6. The measurement unit according to claim 1, wherein the fourth hole has a bottom surface adjacent to a bottom surface of the first hole or the first end face; and a temperature detection element as the sensor is provided in a vicinity of the bottom surface of the fourth hole.

7. A measurement unit comprising:
a case having a pillar shape;
an antenna unit that includes an antenna, the antenna being provided on the case and configured to communicate with an IC tag; and
a sensor provided in the case, wherein:
the antenna unit is provided in a vicinity of a first end face as one end of the case;
the sensor is provided inside the case and a back side of the case with respect to the antenna unit;
the antenna has a circular ring shape in a plan view;
the case has a first hole and a second hole, the first hole opens at a second end face as an end face on a side opposite to the first end face, and the second hole is a through-hole having an end opening to the first hole and another end opening at the first end face;
the antenna unit includes a cover, and the cover is made of an elastically deformable material and internally includes the antenna unit;
the cover has a protrusion portion inserted into a hollow portion of the antenna;
the protrusion portion is provided in the second hole to provide the cover on the first end face, and the antenna unit is provided adjacent to the first end face;
the protrusion portion has a third hole that is a through-hole communicating between outside of the case and the first hole; and
at least the sensor or a first substrate to which the sensor is connected is disposed inside the first hole.

8. A filter device comprising:
the measurement unit according to claim 1;
a filter case having a bottomed tubular shape with an open upper end;
a head provided on the case so as to cover the upper end of the filter case; and
a filter element provided in an internal space formed by the filter case and the head, the filter element including a filtration member and an upper plate, the filtration member having a tubular shape, the upper plate being provided so as to cover an upper end face of the filtration member, wherein
the IC tag is provided on the upper plate; and
the measurement unit is provided on the head such that the antenna unit is exposed to a space formed by the filter case, the filter element, and the head.

9. The filter device according to claim 8, wherein
the upper plate includes a plate-shaped portion and a protruding portion, the filtration member abuts on a lower side of the plate-shaped portion, and the protruding portion is provided on the plate-shaped portion;
the IC tag is provided inside the protruding portion;
the protruding portion projects upward from the plate-shaped portion, and the protruding portion projects outside the plate-shaped portion when viewed along a center axis of the filter element;
the head has a projection to position the protruding portion in a circumferential direction;
the measurement unit is provided in a vicinity of the projection; and
with the filter element inserted into an inside of the case, the IC tag is adjacent to the antenna unit.

10. The filter device according to claim 8, wherein
the IC tag has a hollow circular plate shape;
the IC tag has an inner diameter greater than an inner diameter of the filtration member; and
the IC tag is provided on the upper plate with an adhesive that bonds the filtration member and the upper plate together.

* * * * *